Figure 1:
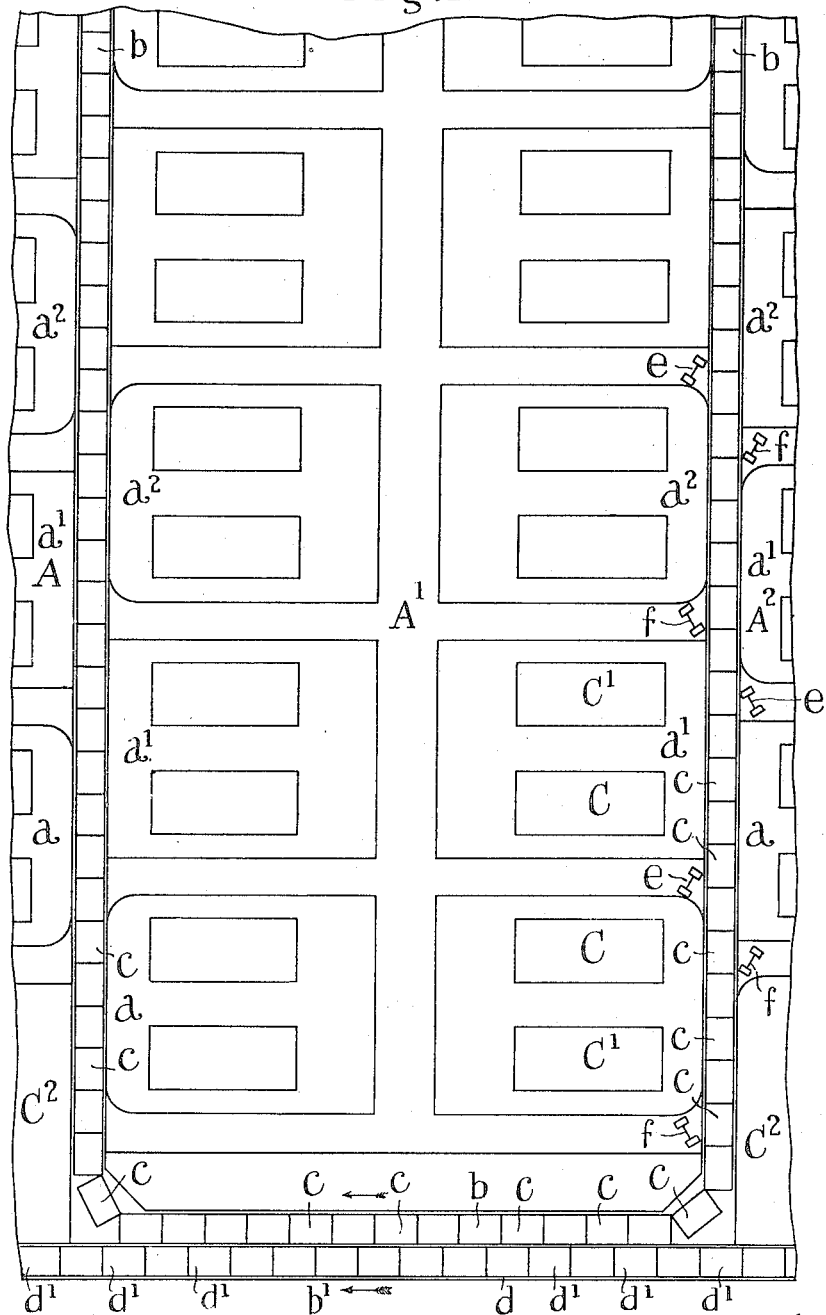

A. W. GATTIE & A. G. SEAMAN.
APPARATUS FOR HANDLING, SORTING, AND DELIVERING PARCELS AND THE LIKE.
APPLICATION FILED JUNE 26, 1909.

1,022,935. Patented Apr. 9, 1912.
12 SHEETS—SHEET 1.

A. W. GATTIE & A. G. SEAMAN.
APPARATUS FOR HANDLING, SORTING, AND DELIVERING PARCELS AND THE LIKE.
APPLICATION FILED JUNE 26, 1909.

1,022,935.

Patented Apr. 9, 1912.

12 SHEETS—SHEET 3.

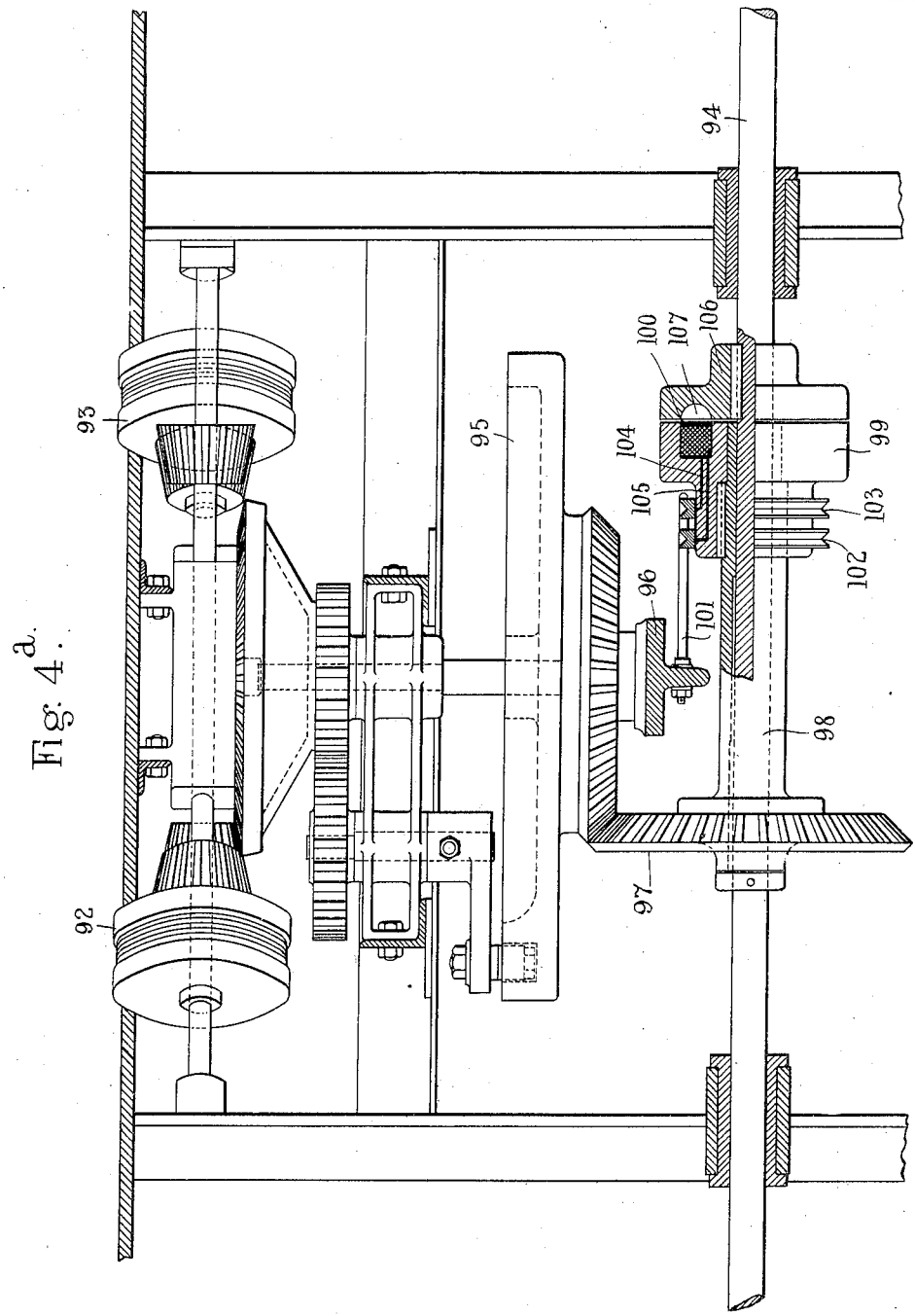

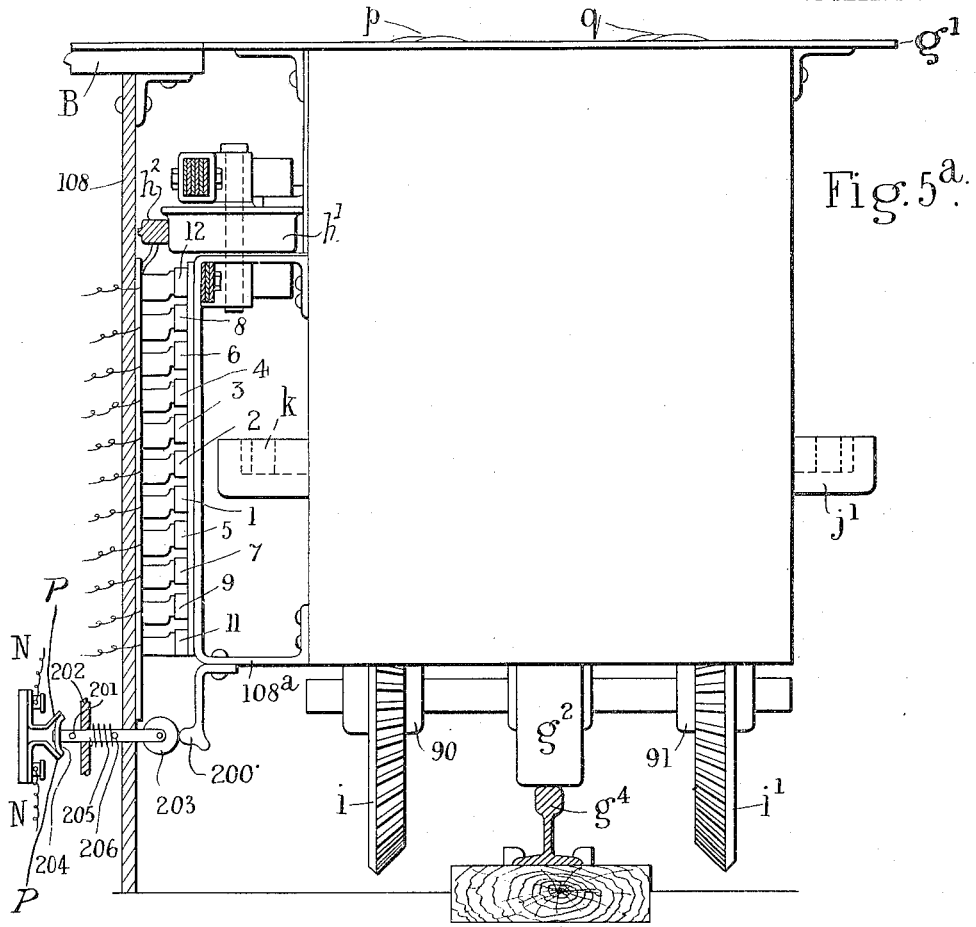
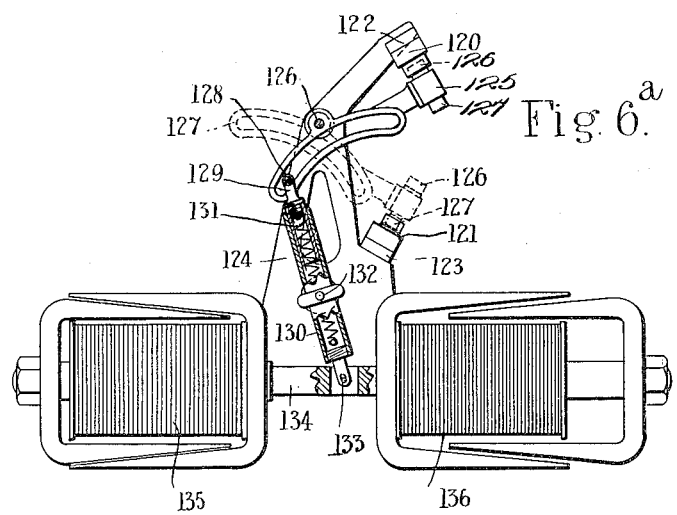

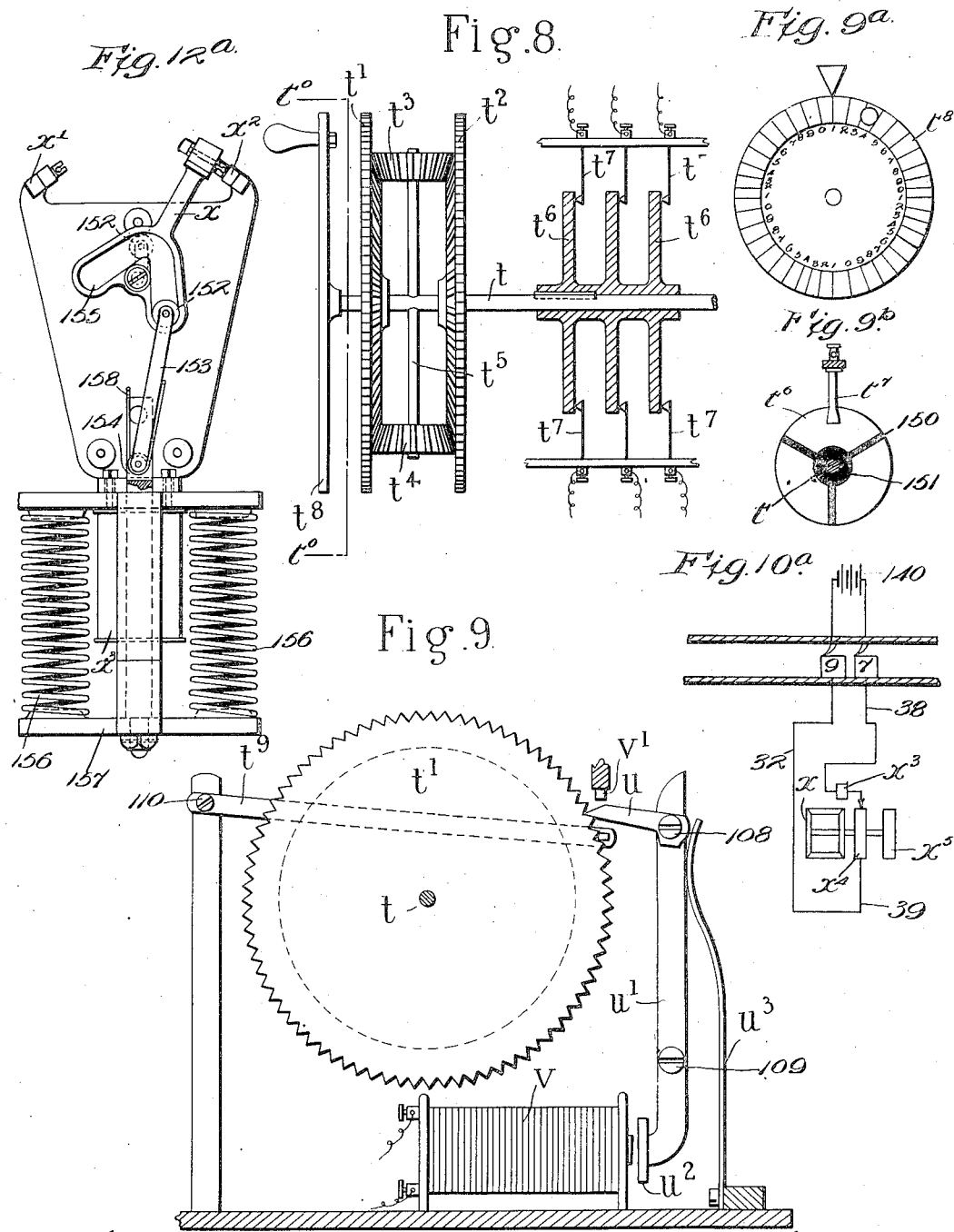

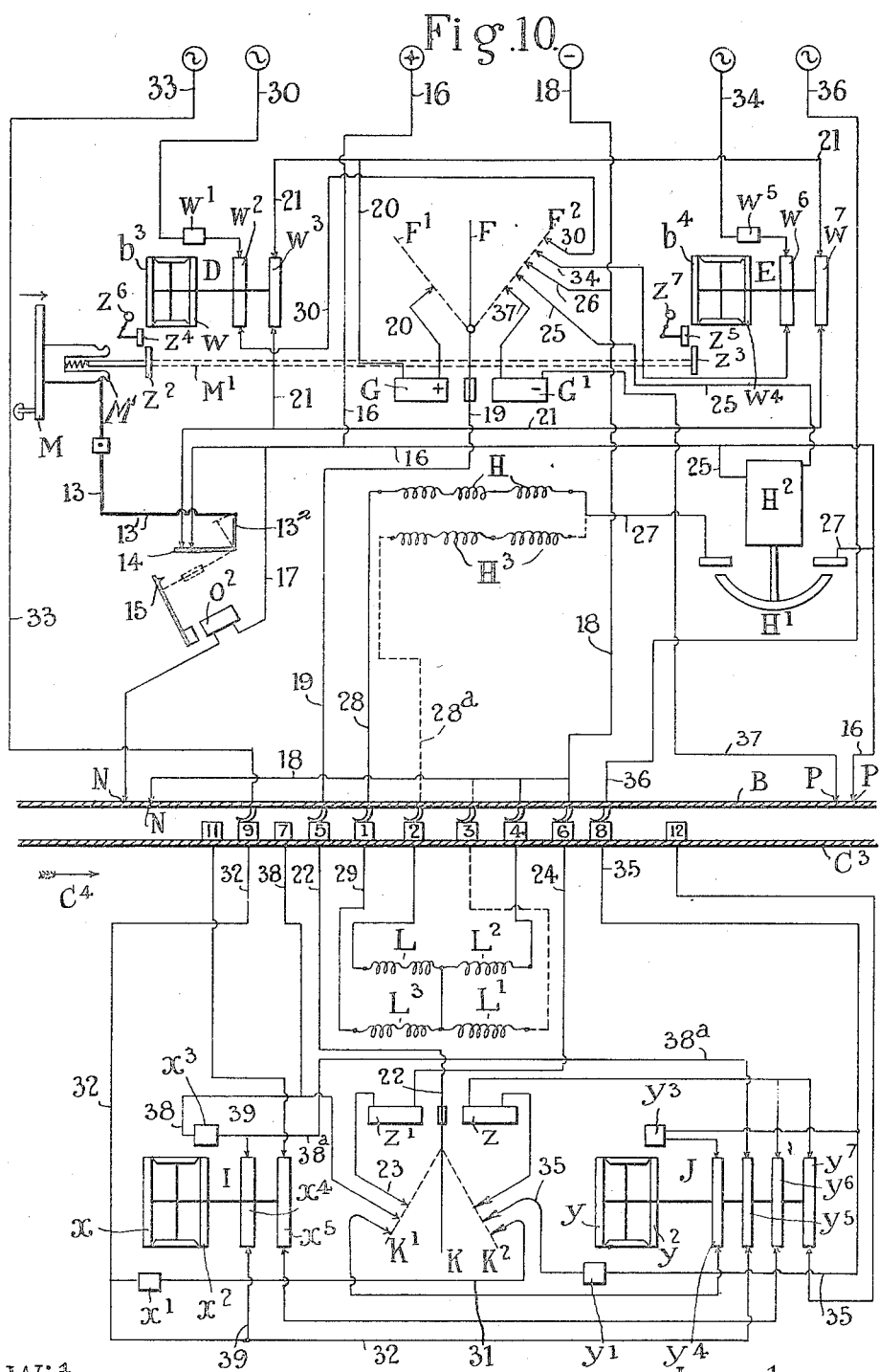

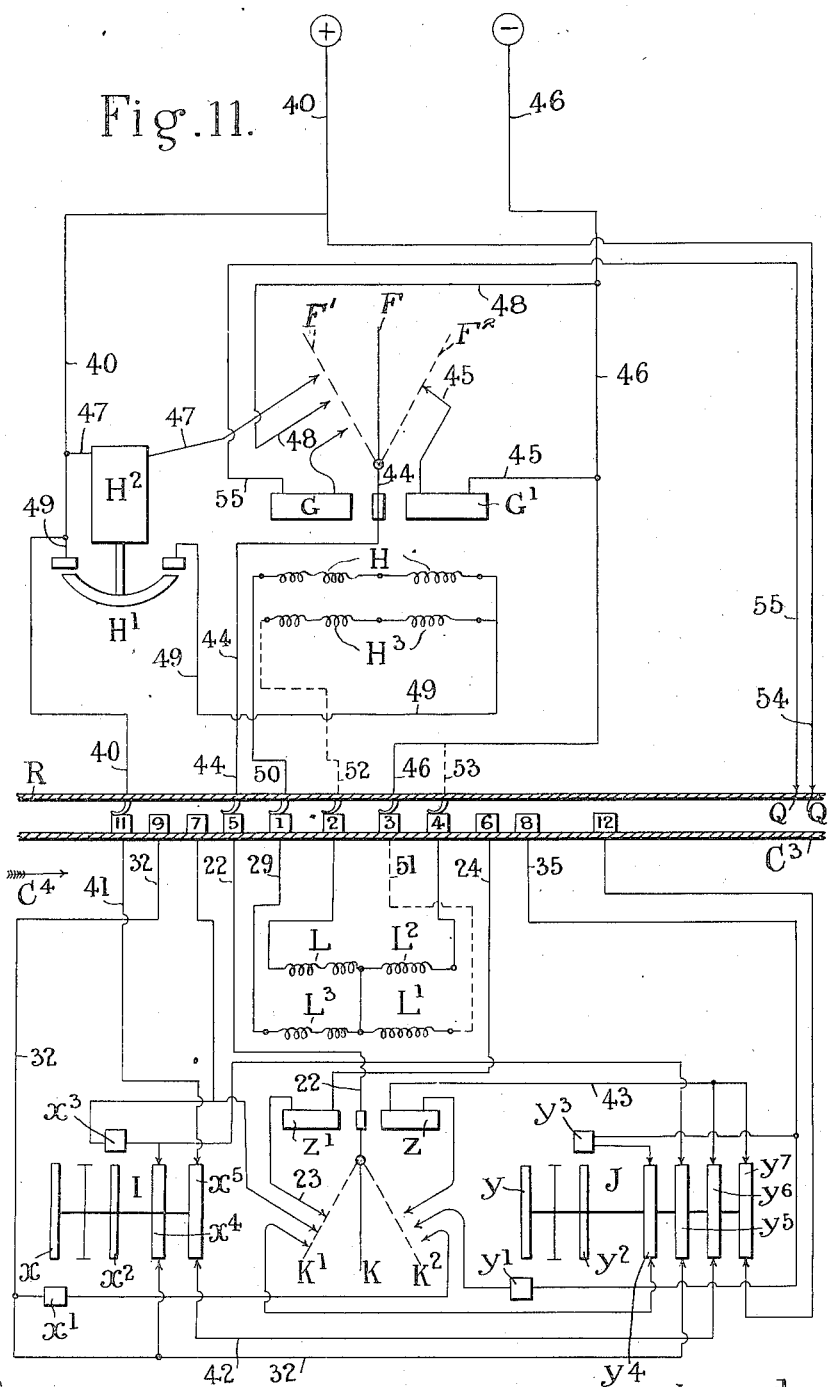

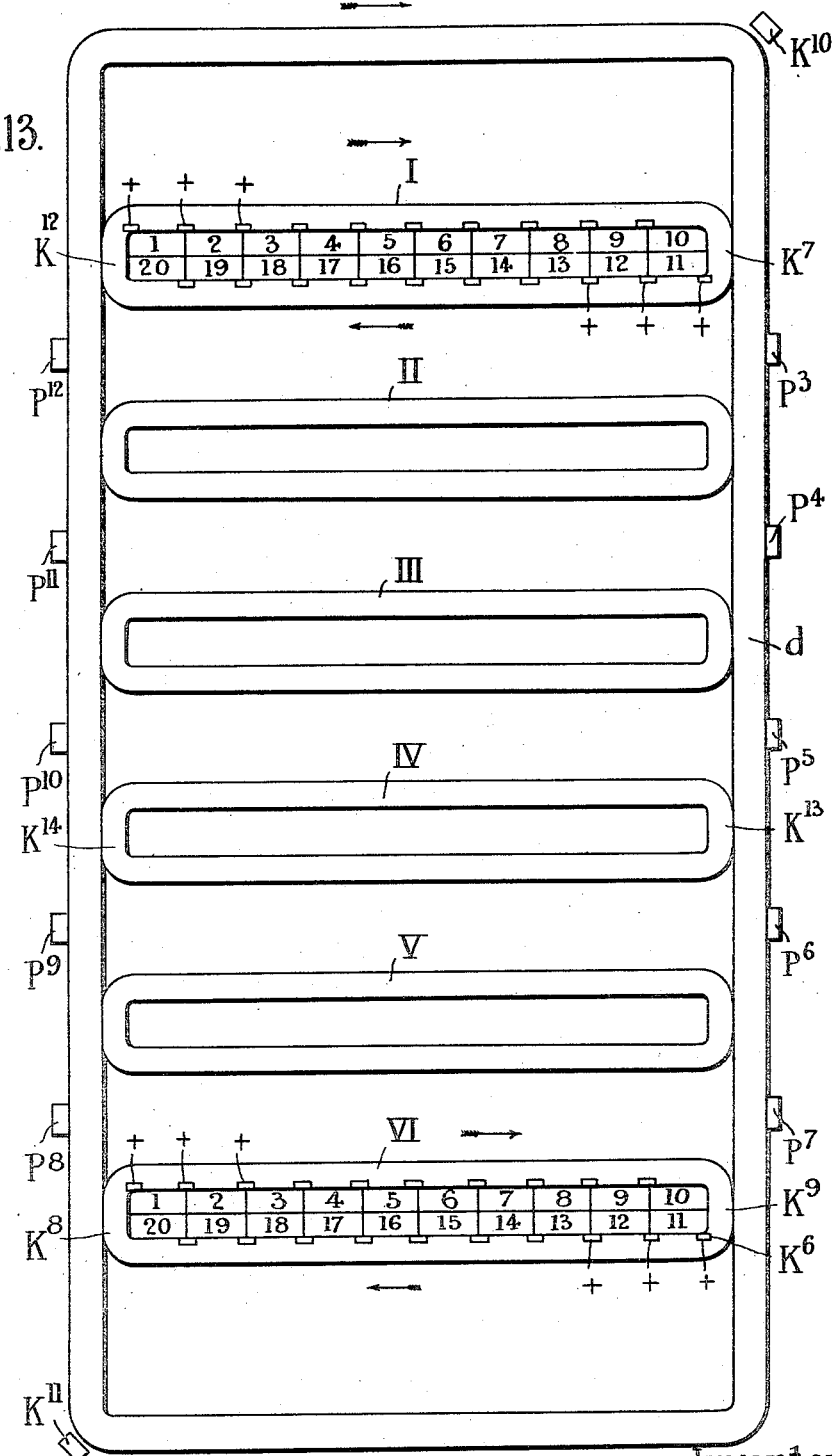

UNITED STATES PATENT OFFICE.

ALFRED WARWICK GATTIE, OF LONDON, AND ARTHUR GEORGE SEAMAN, OF ALTRINCHAM, ENGLAND.

APPARATUS FOR HANDLING, SORTING, AND DELIVERING PARCELS AND THE LIKE.

1,022,935.  Specification of Letters Patent.  Patented Apr. 9, 1912.

Application filed June 26, 1909. Serial No. 504,570.

*To all whom it may concern:*

Be it known that we, ALFRED WARWICK GATTIE and ARTHUR GEORGE SEAMAN, both subjects of His Majesty the King of Great Britain and Ireland, and residents of London, England, and Altrincham, Cheshire, England, respectively, have invented a certain new and useful Improved Apparatus for Handling, Sorting, and Delivering Parcels and the Like, of which the following is a specification.

This invention relates to that class of apparatus for carrying and sorting parcels in which conveyers such as endless moving belts or platforms and transferring mechanism are employed; and the object of the present invention is to provide means by which parcels or packages brought to, say, a central sorting station or clearing house may be readily delivered to a station or compartment, sorted and automatically delivered to other stations or compartments arranged to receive parcels or packages addressed to any given destination or route, with the object of automatically collecting all such parcels or packages for each destination or route in bulk, and when so collected delivering them to the van or carrier intended for that destination.

The desired end is secured as follows:— Assume that a van or lorry enters the clearing house or central sorting station and has, for example, a dozen parcels or packages for delivery at a dozen different destinations, and that such packages or parcels are carried on the van in a removable container. In such a case the removable container is lifted by means of suitably arranged cranes from the lorry and deposited on a fixed station or compartment on the sorting floor of the clearing house. Here it is unpacked and the parcels or packages severally placed on a corresponding number, in this case 12, of different trays, so arranged on casters or wheels that they may be impelled in any direction over a flat surface. Assuming that the first tray contains a parcel or package addressed to a destination at, say, Croydon or on the Croydon route, this tray is placed at the despatch point of the compartment or station. The sorter is provided with a despatch apparatus, to be hereinafter described, which he sets to the number corresponding to the station or compartment from which, according to his instructions, parcels or packages for the Croydon route will be despatched. The sorting floor of the clearing house is divided into a number of separate compartments which are each served by one of a series of moving platforms: that is to say, a number of stations are located so that they are served by one divisional platform; other stations by other divisional platforms; the divisional platforms being served as a whole by a main moving platform; so that by a divisional, the main and a second divisional platform a parcel or package may be moved from any one station or compartment in the clearing house to any other station or compartment. The sorter having set his despatch apparatus with the correct destination number, the system is then automatic in action. The divisional and main platforms are divided into a number of sections, each alternate section of which is called a "trucker" or working section and contains a transfer mechanism, with which the despatching and receiving points are also provided. The platform sections between each trucker are called "dummy" sections and serve to separate the trucker sections and to give space for maneuvering the trays. At a certain instant a trucker will be approaching the despatch point of the station containing the tray for the Croydon route. At this instant when the trucker is a certain definite distance away from the despatching point the automatic mechanism of the despatching point to be described hereafter, is set in motion, with the result that the tray commences to move in a direction which will bring it in a predetermined time toward the approaching trucker in such a way that at the completion of its motion it will have attained an exact position on this trucker and be traveling forward at the velocity at which the trucker itself is moving. The station from which the packages for the Croydon route are despatched may or may not lie on the same divisional platform as that on which the tray now is. If it does it will travel on this platform to the receiving point. When the station for the Croydon route is reached at a pre-determined instant the tray will again be moved by similar automatic transfer mechanism from the trucker to the receiving point in the Croydon station. If the Croydon station does not lie on the same divisional platform then the tray will travel on the platform until it arrives at a point at which this platform transfers trays to the main platform. Here the transfer mechanism will again come into operation and the tray be automatically transferred from the divisional trucker to the main platform trucker. On this it will travel until it reaches the transfer point at which the main platform trucker can transfer the tray to a trucker on the divisional platform on which the station for the Croydon route is situated. It will there be transferred to this divisional platform trucker, and on reaching the receiving point for the Croydon station will be transferred from the trucker to this point as above described. When received at the station for the Croydon route the package will be removed from the tray and placed by the loader into the container which is being sent out on this route. When ready for despatch this container will be lifted by a suitable crane or by other means from the sorting floor and deposited on the van or lorry (or railway truck) from which the parcels for the Croydon route will be delivered at their various destinations. In the same way the other eleven parcels will each be sorted to the various stations corresponding to the routes on which their destinations lie, carried by the clearing house platform truckers to these stations, loaded in containers and sent out to their destinations.

In a suitable arrangement for carrying out our invention we construct the bottom of the tray upon which the parcels are carried, of steel or iron, and we transfer this tray from a despatching station to a trucker section, and from a trucker section to a receiving station or to a trucker on another platform, by means of rollers, provided at each station and carried on each trucker. These rollers, at the proper instant are magnetized by an electric current and by means of suitable mechanism are caused to rotate at a speed which is increased gradually to a maximum value and is then decreased until the said rollers are stationary, the arrangement being such that a tray placed over or coming into contact with any of these energized rollers is gripped and pushed in the required direction to effect a transfer. Each despatching station and each receiving station is provided with one pair of these rollers, the despatching rollers being adapted to rotate in the opposite direction to the receiving rollers. The truckers are provided with two pairs of rollers, adapted to be rotated in either direction for the purpose hereinafter fully described. The operations of these rollers are electrically controlled by means of suitable controllers placed at each despatching station and carried on each trucker, and by means of circuits which are closed by the passage of the truckers themselves.

To enable the invention to be fully understood, we will now describe it by reference to the accompanying drawings which illustrate a complete sorting and transporting system constructed according to our invention.

Figure 2:
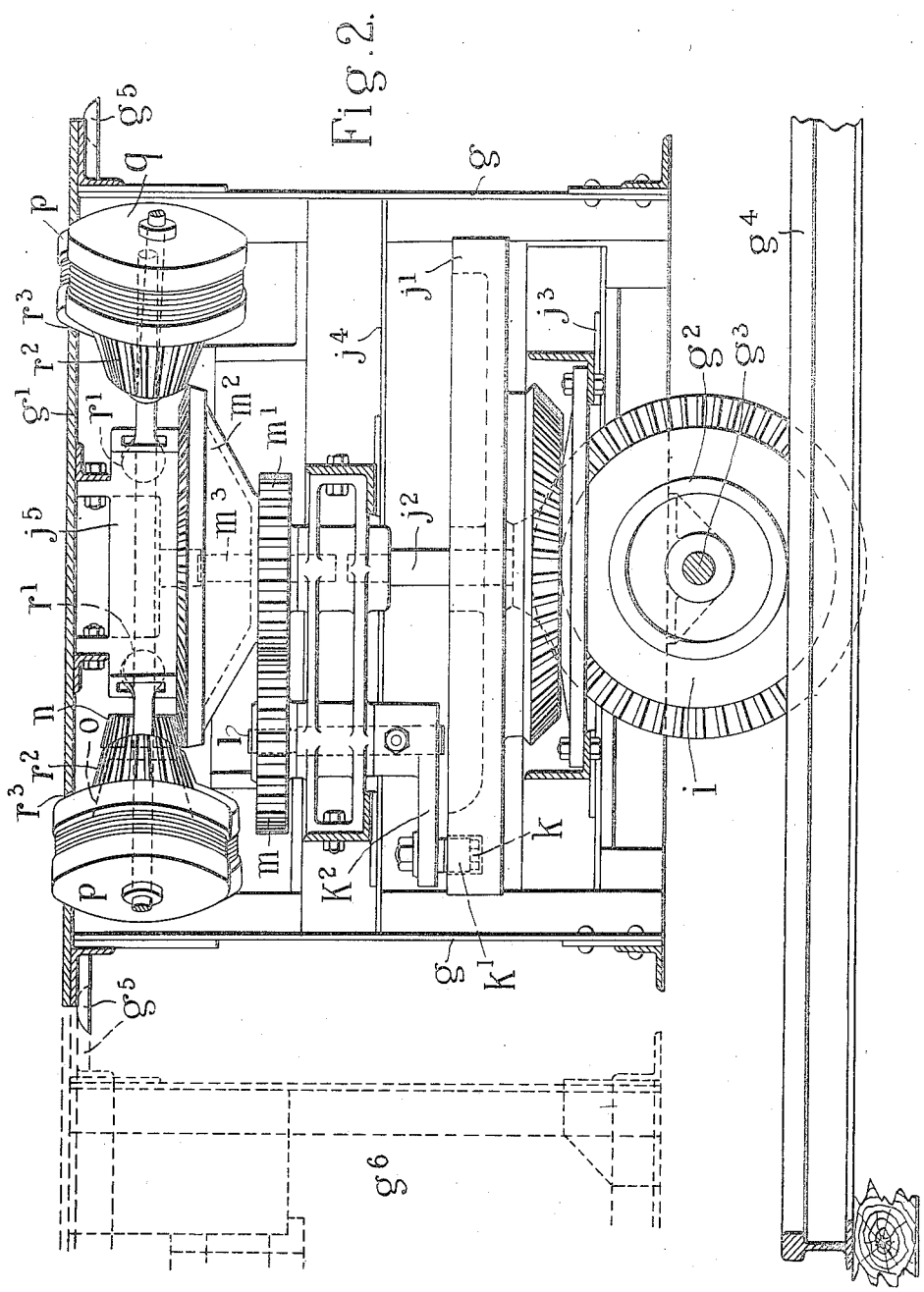
Figure 3:
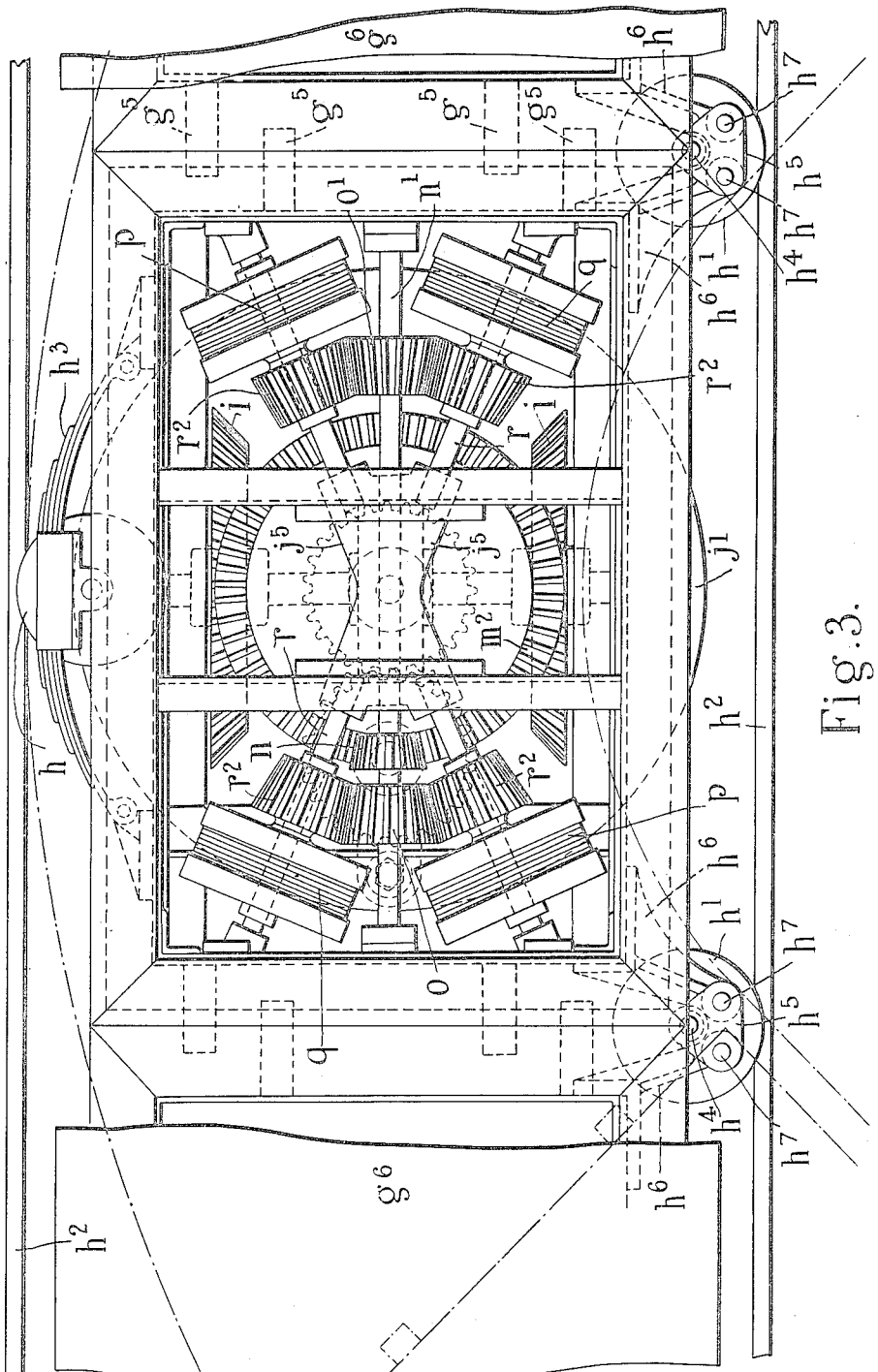
Figure 4:
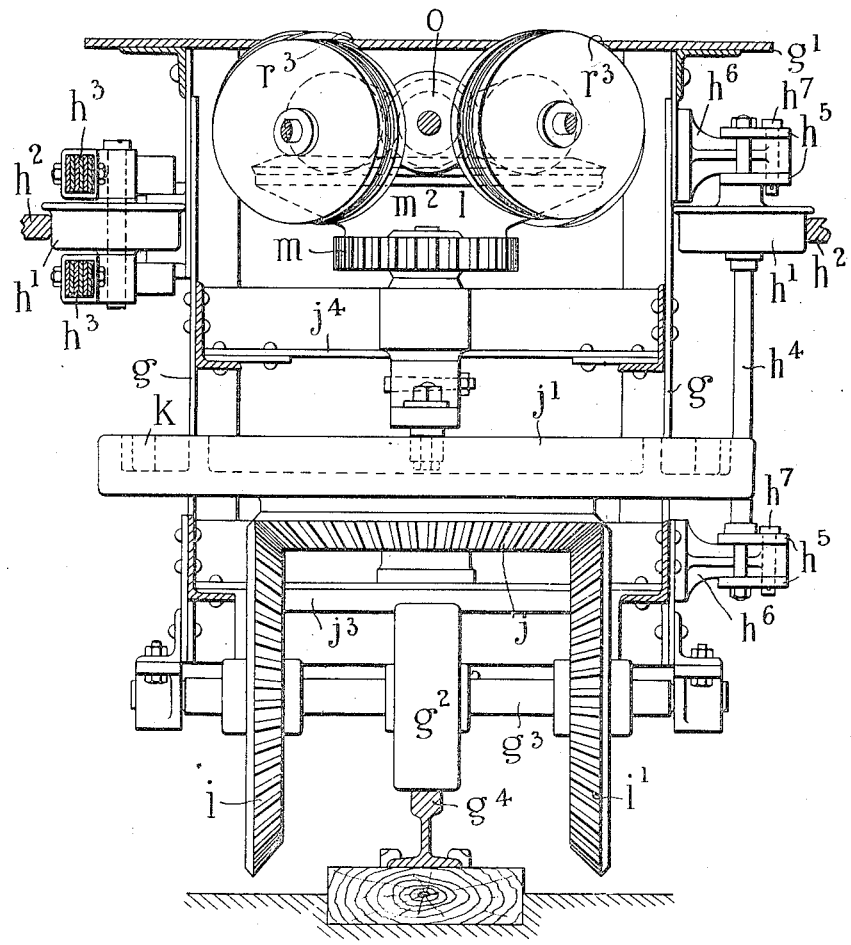
Figure 5:
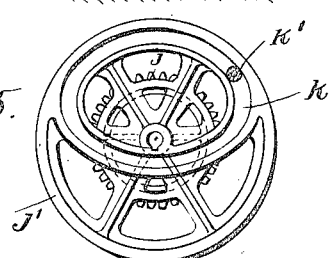
Figure 6:
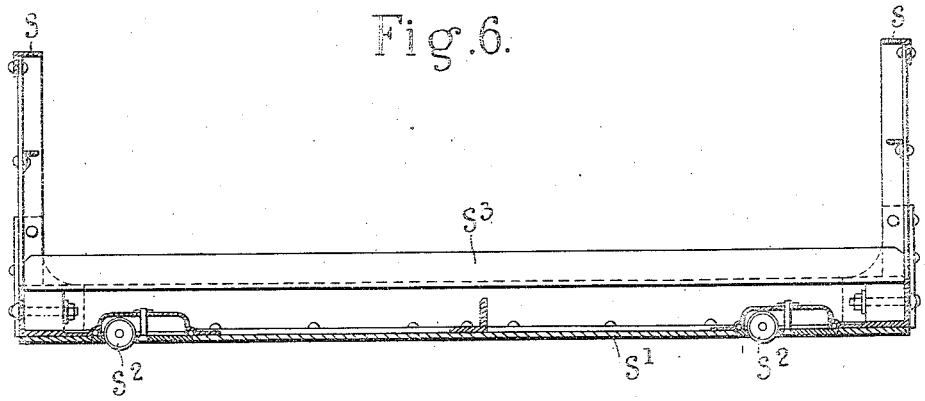
Figure 7:
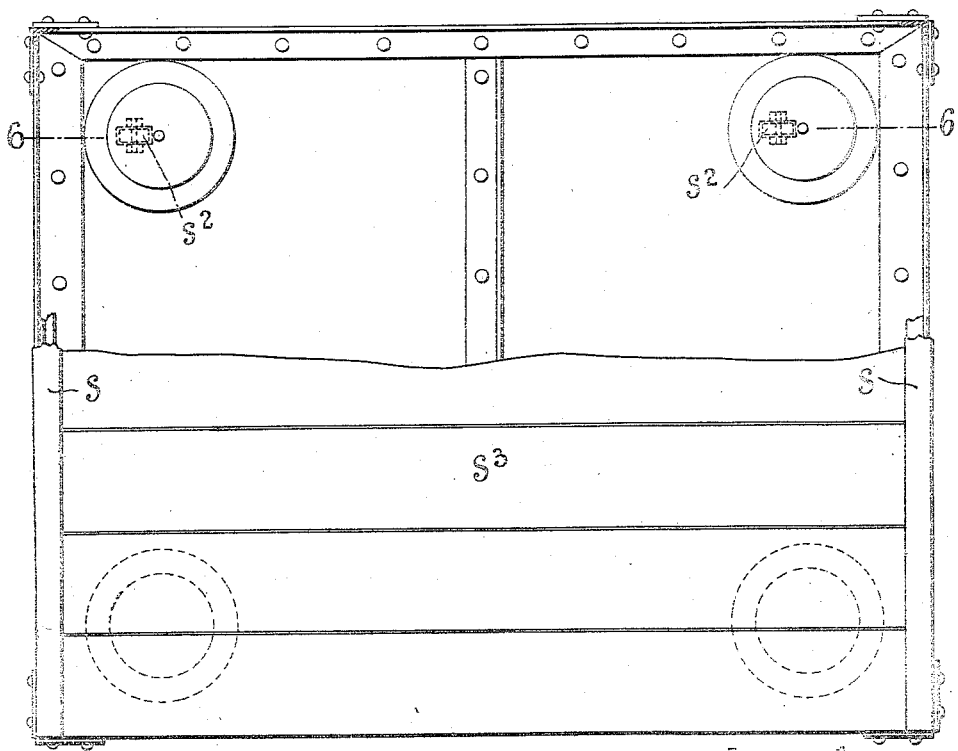
Figure 12:
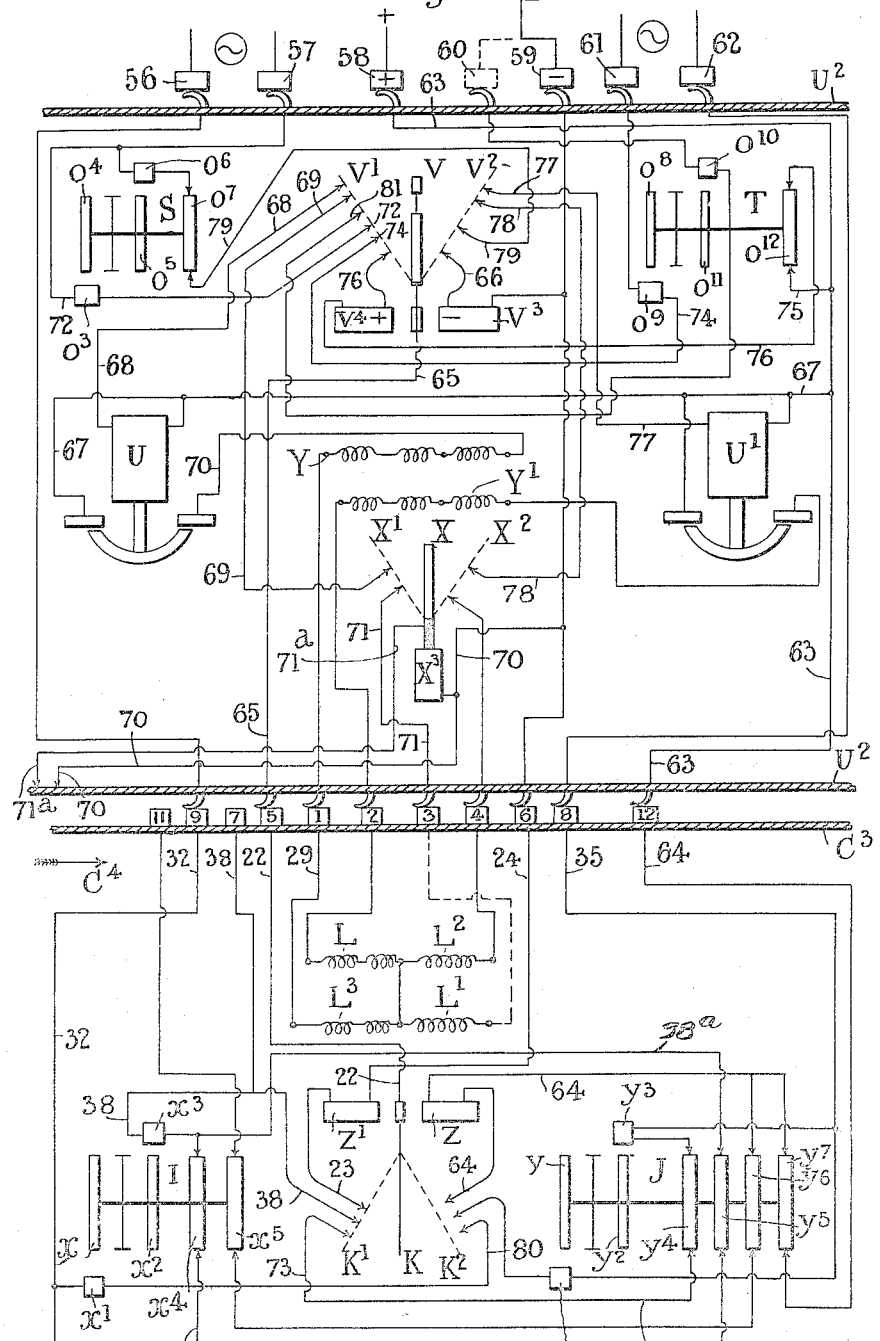

Figure 1 is a plan view of a portion of a clearing house, showing the arrangement of the moving platforms and stations. Fig. 2 is a sectional elevation of a trucker, showing the transfer mechanism in position and Fig. 3 is a plan view of the same with the top plate removed, showing the arrangements for guiding the trucker on a curve, and Fig. 4 is a sectional end view thereof. Fig. 4$^a$ is a sectional elevation of a despatch or receiving point showing the transfer gear. Fig. 5 is a plan view of a detail of the transfer gear, Fig. 5$^a$ is an elevation partly in section of a trucker making contact with a bay showing the arrangement of contacts several portions of the trucker mechanism being omitted. Fig. 6$^a$ is a side elevation of one of the double throw switches employed upon the truckers and stations. Fig. 6 is a sectional elevation on the line 6—6 Fig. 7 of the tray upon which the parcels are transported and Fig. 7 is a plan view thereof. Fig. 8 is a sectional diagrammatic view of a controller the outer casing and operating magnets being removed. Fig. 9 is a section on line $t^9$ Fig. 8, an operating magnet being added and the contacts omitted. Fig. 9$^a$ is a front view of he divided hand wheel $t^8$ Fig. 8. Fig. 9$^b$ is a rear view of one of the selector disks $t^6$ Fig. 8. Fig. 10 is a diagrammatic plan view of a despatch bay showing a divisional trucker making contact therewith to receive a tray. Fig. 10$^a$ is a diagrammatic view showing a portion of a trucker making contact with a bay register point. Fig. 11 is a similar diagrammatic view to Fig. 10, showing the trucker making contact with a receiving bay in order to discharge a tray and Fig. 12 is a similar view showing the divisional platform trucker making contact with a main platform trucker to transfer a tray. Fig. 12$^a$ is a view of a double throw switch employed upon the main platform truckers. Fig. 13 is a diagrammatic plan view of a clearing house showing a method of numbering the bays and platforms.

Referring first to Fig. 1, the floor of the clearing house is divided into a number of groups or divisions A, A$^1$, A$^2$, each containing a number of stations $a$, $a^1$, $a^2$, termed "bays", and each of which corresponds to a district or destination, or subdivision into which parcels are to be collected so that they may be despatched in bulk. Each group may conveniently contain 40 such bays (10 only being shown) suitably numbered and the alternate groups of bays are surrounded by a divisional platform $b$ moving at a suitable speed, say 3 miles per hour in the direction of the arrow $b'$ each alternate section $c$ of which is provided with trucker mechanism. It will be seen that a divisional platform $b$ serves all the bays $a$ $a^1$ in its own division, and also half the bays $a$ $a^1$ of the adjacent groups. The divisional platforms $b$ are in turn served by the main platform $d$, which moves at twice the rate of a divisional platform, say 6 miles per hour, in the direction of the arrow $b^1$ and carries truckers $d^1$ and passes completely around the clearing house and in so doing runs parallel for a certain distance with the ends of each divisional platform $b$. By the above described arrangement of platforms it is possible to transfer a tray by means of suitable mechanism from any divisional platform $b$ to the main belt $d$ and thence to any other divisional platform in the clearing house. Each of the bays $a$ $a^1$ is provided with despatching rollers $e$ and receiving rollers $f$ arranged as shown, and also with containers C for the parcels to be despatched, and containers $C^1$ for collecting the parcels received from the platforms. The parcels to be sorted and despatched are brought to the clearing house in the containers C which may be detachable car bodies, the said containers being hoisted up through wells $C^2$ arranged at suitable points in the clearing house floor by means of cranes, which travel above the bays and place the containers in position. The containers $C^1$ when filled are lowered through the wells into the carts or wagons. This arrangement enables parcels to be quickly and effectively dealt with in bulk. It must be understood that although we have shown only one divisional platform $b$ serving a group of forty bays $a$, $a^1$, any number of divisional platforms may be employed, each serving a group containing a number of bays most suitable to the requirements of a particular clearing house, truckers being provided at any suitable points on the main and divisional platforms. The platforms $b$ $d$ are moved at a constant speed by any suitable means and consist of a series of sections of suitable length and width, formed of steel frames provided with a steel, gunmetal, or other suitable top plate, each section being supported upon a single track wheel running on a rail and being guided between rails by means of flanged guide wheels running horizontally. The top and bottom corners of one side of each section are pivoted between two coupling plates which act as hinges, and carry the axle of the guide wheel on that side of the section, the guide wheel on the other side of the section being mounted between a pair of bow springs. This coupling arrangement allows the sections, when turning corners, to swing apart at the uncoupled edges, the spring pressing the guide wheel mounted thereon in contact with the guide rail.

We will now fully describe the above construction with reference to the trucker shown in Figs. 2, 3, 4 and 5. In Fig. 2, $g$ is the steel framework of the trucker and $g^1$ is the top plate, the whole being supported upon the track wheel $g^2$ keyed upon the spindle $g^3$ and bearing on a rail $g^4$, the said rail passing around the divisional bays in the case of a divisional platform and around the clearing house in the case of the main platform. The top plate $g^1$ of the trucker fits closely with the top plates of each dummy section $g^6$ as shown resting upon the beveled steel tongues $g^5$ with which both trucker and dummy section are provided, thus forming a platform having a smooth level surface. $h$ $h^1$ $h^1$ are the flanged guide wheels, bearing upon the guide rails $h^2$ the guide wheel $h$ being mounted between the bow springs $h^3$. The guide wheels $h^1$ $h^1$ are carried upon spindles $h^4$ mounted in the coupling plates $h^5$ $h^5$, to which plates the brackets $h^6$ $h^6$ on the top and bottom corners of the trucker, and adjacent dummy sections are pivoted at $h^7$ $h^7$. This coupling arrangement enables the sections when turning around a corner to swing apart on one side and to take up the position shown by the dot and dash lines in Fig. 3. $i$ $i^1$ are bevel wheels loosely mounted upon the shaft $g^3$ and adapted to be separately clutched thereon by means of electromagnetic clutches 90, 91 actuated when required by separate electric circuits, the said wheels gearing with a bevel wheel $j$ secured to the underside of a cam wheel $j^1$ mounted on the shaft $j^2$. The shaft $j^2$ is journaled in bearings carried in the trucker frames $j^3$ $j^4$. The cam wheel $j^1$ is provided with a cam groove $k$ of the shape shown in Fig. 5, in which groove a roller $k^1$ carried on the end of a crank arm $k^2$ rolls. The crank arm $k^2$ is mounted on the lower end of the shaft $l$ which is supported in bearings on the frame $j^4$ and carries at its upper end the pinion $m$ gearing with the pinion $m^1$ secured to the underside of the bevel wheel $m^2$. The bevel wheel $m^2$ is mounted on the shaft $m^3$ journaled in the frame $j^4$ and in the bracket $j^5$ bolted to the top plate $g^1$, and gears with the bevel pinion $n$ carried on the shaft $n^1$ mounted in the end plates of the trucker. This shaft $n^1$ is also provided with the bevel pinion $o$ $o^1$. $p$ $p$ and $q$ $q$ respectively are the transfer rollers adapted to be driven in pairs in either direction according as one or other of the wheels $i$, $i^1$ is clutched on shaft $g^3$. That is to say $p$ $p$ are driven together and $q$ $q$ are driven together, in either direction. Each roller is secured to one end of a shaft $r$ the other end of which is rotatably secured by a joint (indicated at $r^1$) in the bracket $j^5$, the openings in the bracket $j^5$ through which the said shafts $r$ enter being of the shape shown to enable the rollers to rise slightly through slots $r^3$ in the top plate $q^1$, for the purpose hereinafter described. The shafts $r$ $r$ are also provided with pinions $r^2$ which gear with the pinions $o$ $o^1$. The rollers $p, p, q, q$ are each suitably wound and electrically connected in series (not shown) with one of the electromagnetic clutches on the shaft $q^3$, in such a manner that on completing the electrical circuit for one of the said clutches, the motion of the track wheel $g^2$ is communicated through the gear to the corresponding pair of rollers $p$ $p$ or $q$ $q$ which are thus rotated and at the same time magnetized by the current, so that if the steel bottomed parcel tray be placed over them, the said rollers will rise slightly through the slots in the top plate $q^1$ and grip the bottom of the tray and drive it in the desired direction. In the case of the trucker rollers, as only one pair can be magnetized at one time it follows that only one pair will rise and work upon the tray, the other pair of rollers, although rotating are not magnetized and consequently do not rise and interfere with the transfer. As shown in Fig. 4ª each despatch and receiving point of every station is provided with one pair of transfer rollers 92, the driving gear thereof being identical with that of a trucker (see Figs. 2 to 5) with the exception that the motion of the mechanism is derived from a horizontal rotating shaft 94, the cam wheel 95 being supported on a bracket 96. The bevel wheel 97 is secured to a sleeve 98 loosely mounted upon shaft 94, said sleeve also carrying one half 99 of a magnetic clutch containing an electromagnet 100 which receives current through the bars 101 (one only being shown) rings 102, 103, and leads 104, 105. The other half 106 of the clutch is secured upon the shaft 94, and contains a soft iron ring 107. It will be obvious that when the part 99 is energized it will attach itself to part 107, thus clutching wheel 97 to the shaft 94. The horizontal shaft 94 runs longitudinally of each bay and is rotated by suitable means at exactly the speed of the shaft $g^3$ of the trucker track wheel $g^2$, so that the movements of trucker and station transfer mechanism are synchronous.

The object of the above described mechanism is to impart such a motion to the tray carrying the parcels, as shall transfer it from a station to a moving platform and from a moving platform to another moving platform and vice versa, in a certain definite manner without shock. The shock is obviated by means of the motion derived from cam wheel $j^1$ and the crank $k^2$. The cam groove $k$ in the said cam wheel is so designed that the uniform motion derived from the track wheel $g^3$ is, in one revolution of the said wheel $j^1$, caused to give to the rollers $p, p, q, q$, through the intermediate gear, an accelerated rotation, which gradually increases to a maximum and then gradually falls away until at the end of a revolution of the wheel $j^1$ the rollers become stationary. This gradually accelerated motion enables the tray to pass from the rotating despatch rollers to the synchronously rotating moving trucker rollers, without shock or concussion, as will be seen from the following description of the transfer action:—
The transfer rollers at each bay are set at a suitable angle to the platform, one pair of the trucker rollers $p, p, q, q$ being set at a suitable angle corresponding with the bay transfer rollers situated upon one side of the platform, the other pair being set to correspond with the bay rollers upon the opposite side. The motion of the tray from a position of rest at the despatch point of any bay, to its position of rest on the surface of the continually moving trucker, is performed as to the first half by means of the bay transfer mechanism and as to the second half by means of the trucker mechanism. Both these mechanisms are set in motion by the controlling mechanism at the same instant, which instant is determined by the trucker arriving at a certain definite position with regard to the despatch point of the bay. When the tray is to be transferred, from a despatch bay to a trucker, or vice versa, the electric circuits controlling the clutches and the magnetizing circuits of the rollers of the bay and trucker transfer rollers, which have been previously connected by the controlling mechanism are completed by the trucker making certain electrical contacts. Immediately this occurs, the transfer mechanisms above described are set in motion and begin to revolve the rollers of each mechanism so as to impel the tray in the proper direction, while the rollers are magnetized at the same instant, with the result that they attach themselves to the underside of the tray and impart to it a gradually increasing motion and remain in contact with it until it has completed one half of the total motion required to transfer it to the moving trucker. At this instant the edge of the tray is in a position over one part of the rollers of both the despatch bay and trucker mechanisms. Any further motion of the tray causes it to recede from the rollers of the despatch bay, which are therefore unable to further influence its motion, and from that point onward it is moved by the rollers of the trucker mechanism. The speeds of the trucker rollers and the bay rollers are so arranged that the resultant velocity of the trucker rollers, in the direction of motion of the platform, at the instant of transfer from the bay rollers to the trucker rollers, is equal to that imparted to the tray by the bay rollers. The exact motion of the tray is composed of two motions, one, a motion in the direction in which the trucker is moving, and a motion at an acute angle to this given by the rollers. It is obvious that if both these motions up to the point of the mid-way movement of the tray increase at uniform rates the motion of the tray up to this point will be rectilinear, so that such rectilinear motion can be imparted by rollers revolving on axles. At the point of midway motion the tray will have received a velocity in the direction of the motion of the trucker of exactly one half of the velocity of the said trucker, and from this point onward the velocity of the tray relatively to that of the trucker will be uniformly increased. The motion of the tray sidewise to the trucker must also be uniformly reduced, and consequently the motion of the tray on the trucker with regard to its final position on the said trucker will also be rectilinear, and this rectilinear motion can therefore also be imparted by rollers revolving on axles. It follows that the actual motion in space of the tray when under the action of the trucker rollers is not rectilinear, but is a curved motion.

Figs. 6 and 7, show a suitable tray for use in this system, the said tray consisting of the steel end frames $s$ secured to a smooth steel bottom plate $s^1$, in which plate are mounted the ball bearing casters $s^2$, which enable the tray to be easily moved over a level surface. The tray is also provided with a wooden false bottom $s^3$, upon which the parcels are placed.

The various electrical circuits required to operate the bay and trucker transfer mechanisms are controlled by means of controllers provided at each despatching bay and carried upon each trucker. All these controllers are constructed upon the same principle, as will now be described, with reference to Figs. 8 and 9 which illustrate digrammatically the essential parts of a controller. $t$ is a shaft having loosely mounted thereon the two toothed wheels $t^1$ $t^2$, provided on their inner sides with bevel teeth gearing with the planet wheels $t^3$ $t^4$ mounted on spindle $t^5$ which latter is rigidly secured to the shaft $t$. $t^6$ are a number of disks, which we call selector disks, keyed upon the shaft $t$ and each connected by means of suitable contact makers $t^7$ with various circuits hereinafter described, the disks being so arranged that contacts will be made and broken at certain predetermined points according to the angular displacement of the shaft $t$. A rear view of one of these disks $t^6$ is shown in Fig. 9$^b$, in which the contact portions of the disk are shown by the black portion 150, current being supplied to the shaft $t$ by lead 151, the contact $t^7$ completing the circuit when the disk is turned into the correct position. These selector disks are in reality switches, and each controller is fitted with a certain number according to its function. It will be obvious that if one of the wheels $t^1$ $t^2$ be held stationary, and the other wheel be caused to turn through one revolution, then the shaft $t$ carrying with it the selector disks $t^6$ will make half a revolution only, and also if both wheels $t^1$ $t^2$ be displaced equally in opposite directions the shaft $t$ will remain stationary, in fact, the angular displacement of the shaft $t$ is equal to half the difference between the angular displacements of the oppositely displaced wheels $t^1$ $t^2$, the selector disks being correspondingly displaced. As shown in Fig. 9, each of the wheels $t^1$ $t^2$ is adapted to be turned a tooth at a time, but in opposite directions, by means of a pawl $u$ pivoted at 108 upon an arm $u^1$ pivoted at 109 carrying the armature $u^2$ the said pawl $u$ engaging with the outer teeth of the wheel under pressure of the spring $u^3$, and $t^9$ is a stop arm pivoted at 110. When the electromagnet $v$ is energized, the armature $u^2$ is attracted thereby causing the pawl $u$ to be drawn back from the wheel $t^1$ and allowing the end of the pawl to rest on the stop arm or detent $t^9$. When the magnet $v$ is deënergized the spring $u^3$ presses the arm $u^1$ forward, causing the pawl $u$ to press against a tooth of the wheel and so move said wheel through one tooth space in a contraclockwise direction. The stop arm $t^9$ resting in a tooth space of the wheel as shown, prevents backward motion of said wheel, and also serves as a rest upon which the pawl $u$ may be positioned, a stop $v^1$ being also provided to prevent the pawl from flying upward when working at high speed, a stop $V^2$ being provided to limit the backward motion of the arm $u^1$. The electromagnet $v$ is preferably provided with a core formed of a bundle of iron wires. Or, the wheels may be turned by any suitable pawl and electromagnet mechanism. On energizing the electromagnet $v$ by an alternating current, it follows that the armature $u^2$ is attracted and released at a speed corresponding to the alternations of the current per second, and consequently the wheels $t^1$ or $t^2$ will be turned in opposite directions through a number of teeth depending on the length of time the circuit is made. By employing an alternating current and regulating the length of time of the contact, we can thus turn the wheels $t^1$ $t^2$ through any required number of teeth. The wheel $t^1$ is called the "adder" and the wheel $t^2$ the subtractor or "subber." In setting the controller the adder wheel $t^1$ is displaced through an angle corresponding to the number of "register" points to be passed by the trucker before the destination is reached, by means of a suitably divided hand wheel, such as $t^8$ (Fig. 9$^a$). This wheel $t^8$ is termed the "register" wheel and the angle it is turned through corresponding to the number of receiving bays to be passed, is termed the "bay register."

With a controller constructed on the above principle it will be obvious that by displacing the shaft $t$ with its selector disks $t^6$ through the desired angle, and then causing a series of alternating impulses to flow through the subber and adder magnets $v$ causing the shaft $t$ to be turned through the planet wheels, the selector disks $t^6$ may be turned so that the circuits they control shall be made or broken as required after a certain predetermined number of impulses have passed through the magnets $v$. If the subber and adder magnets be energized by a direct current, then one impulse only would pass through the said magnets.

Broadly speaking, in the simplest case, when a tray is to be despatched from a despatch bay to a receiving bay on the same divisional platform, the control arrangement is as follows:—The register disk $t^8$ and consequently the selector disks $t^6$ of the despatching bay controller are set with the required "bay register." The oncoming empty trucker, also provided with a similar controller, makes certain contacts with the bay which energize the transfer rollers of the bay and trucker, and transfers the tray to the trucker, while at the same time the trucker makes other contacts connecting the adder and subber wheels of both controllers and transferring to the trucker controller selectors the "bay register" with which the bay controller has been set. The trucker passing on makes a direct current contact called a "bay register point" with each receiving bay it passes, which sends a single impulse through the subber magnet of the trucker controller and turns the selector disks, the arrangement of the said selector disk contacts being such that after the correct number of impulses has passed and the trucker makes contact with the proper receiving bay, the said selector contacts are in position to make and break the proper bay and trucker circuits, the current passes, energizing the trucker and bay transfer mechanism, and the tray is transferred.

To enable a tray to be transferred from one bay on a divisional platform on to the main platform and then on to a bay on another divisional platform, the despatch bays and truckers are also provided with a platform controller which consists of a set of subber and adder wheels and selector disks which can be set at the despatching point with a "platform register" by means of a platform register wheel such as $t^8$, in the manner above described for the bay register, to the number of divisional platforms the tray must pass before reaching the divisional platform for which it is destined. This platform register is transferred together with the tray and any bay register the divisional trucker may have, to the main trucker controllers. Platform register points are provided, which as the main platform trucker carrying the tray passes, energize the trucker platform controller subber magnet exactly in the manner in which the bay register points energize the trucker bay controller. Thus a transfer is effected at the desired divisional platform, the bay register of the main trucker being again transferred to the divisional platform trucker controller so that as the said divisional trucker passes its bay register points the register is finally removed and the tray is delivered at the desired receiving station. The controllers are also provided with double-throw switches which are moved by suitable electromagnets energized by the trucker as it arrives at and departs from the bay at which it receives or discharges, the said switches by making and breaking certain circuits prevent truckers from communicating with bays until the bay controller is set, and also with loaded truckers on the main platform.

Referring now to Fig. 10 which is a diagrammatic plan view of the arrangement of the controllers and circuits of a despatching bay and of a divisional platform trucker, the said trucker being shown in the contact position with a bay for the purpose of receiving a tray:—B represents the edge of the despatching bay and $C^3$ the edge of the trucker, the motion of the trucker being in the direction of the arrow $C^4$. The contact strips on the side of the trucker are indicated by the numerals 1 to 12 (number 10 being excepted), which numerals also serve to indicate the contact wipers on the bay which make contact as shown with respective strips arranged in different planes on the side 108 as shown in Fig. 5$^a$, said strips being carried on a bracket 108$^a$ on the trucker. We have found it convenient to arrange the circuits of the various bays, which are on both sides of the divisional platform, in such a manner that the contact wipers of the said circuits are all upon one side of the divisional platform only, thus necessitating contact strips upon one side of the trucker only, but it is obvious that we may arrange the wipers upon both sides of the platform and provide contact strips upon both sides of the trucker. D is the bay controller upon which the bay register is set, $b^3$ is the adder wheel and $w$ is the subber wheel thereof, $w^1$ is the electromagnet actuating $w$, and $w^2$ $w^3$ are the selector disks. E is the platform controller on which the platform register is set, $b^4$ is the adder wheel, $w^4$ is the subber wheel thereof actuated by the electromagnet $w^5$ and $w^6$ $w^7$ are the selector disks. F is a double throw switch of any suitable type, and is adapted to throw over to the left or right and close certain circuits as indicated by the dotted lines $F^1$, $F^2$, and G, $G^1$ are the electromagnets for operating the same. Switch F may conveniently be constructed as shown in Fig. 6a, in which 120, 121 are the left and right contact clips to which the various circuits are connected, said clips being secured respectively to insulated bars 122, 123, carried upon a standard 124. The switch arm 125 carries contact blocks 126, 127 adapted to make contact with clips 120, 121 respectively, and is pivoted to standard 124 at 126. Said arm 125 is adapted to be rocked by means of a slotted link 127 attached to the pivot 126, in which a roller 128 carried upon a hollow rod 129 works. Rod 129 is slidably mounted in a tube 130 its movement being limited by a spring 131 one end of which is attached to the top of the rod, the other end being attached to the bottom of the tube 130. The outer tube 130 is pivotally mounted in a suitable support (not shown) at 132. The tube 130 is pivotally attached at 133 to a core 134 the ends of which pass into the solenoid coils 135, 136. According as one or other of these coils is energized the core 134 is pulled to the left or right causing the link 127 to rock arm 125 in the well known manner. H represents the winding of the pair of magnetic transfer rollers and the electromagnetic clutch (see $p$ $p$ or $q$ $q$ Fig. 2.), electrically connected in series and $H^1$ is a switch operated by the magnet $H^2$ when it is required to close the circuit through the clutch and rollers H. $H^3$ indicates the clutch and transfer rollers electrically connected in series, of a bay on the opposite side of the trucker, which we have here inserted to enable the action of both pairs of trucker rollers to be demonstrated, the circuits of bays on both sides of the trucker being identical. Referring now to the trucker:—I is the bay controller which receives the bay register, $x$ is the adder wheel having the actuating magnet $x^1$, $x^2$ is the subber wheel and $x^3$ the actuating magnet thereof. $x^4$ $x^5$ are the selector disks. J is the platform controller and $y$ is the adder wheel and $y^1$ the actuating magnet thereof. $y^2$ is the subber wheel $y^3$ the actuating magnet thereof and $y^4$ $y^5$ $y^6$ $y^7$ are selector disks. K is the double throw switch, similar to the bay switch F, and adapted to throw over into the positions $K^1$ $K^2$, and $z$, $z^1$ are the operating magnets therefor. L, $L^3$, each indicate the windings of one pair of transfer rollers and $L^1$ $L^2$ the windings of the electro-magnetic clutches, electrically connected in series, so that each clutch may be used with each pair of rollers.

Instead of providing each of the control lers D, E, with a register hand wheel $t^8$ as shown in Fig. 9, we have found it convenient to set both the controllers by means of a single hand wheel M upon which both bay and platform schedule numbers are marked, the said wheel being secured upon the shaft $M^1$ carrying pinions $z^2$ $z^3$. By pressing the push button $z^6$, the pinion $z^4$ is brought into gear with pinion $z^2$ and the bay adder wheel $b^3$, thus by turning wheel M to the required register the adder wheel $b^3$ is similarly set. Again by releasing push button $z^6$ and depressing a similar push button $z^7$ the pinion $z^5$ is geared with pinion $z^3$ and platform adder wheel $b^4$, and by turning wheel M to the requisite platform register, the adder wheel $b^4$ is similarly set. The wheel M is mounted upon the shaft $M^1$ in such a manner that it may be slightly depressed thereon and operate a circuit breaker as hereinafter described.

To despatch a tray from the bay, the tray is placed upon the rollers H and the operator presses in the wheel M in the direction of the arrow, and in so doing moves the lever 13, one end of which rests in a groove $M^1$ in the bearing of the wheel M, which in turn moves the pivoted levers $13^1$, $13^2$, and opens the circuit breaker 14. He next presses in the push buttons $z^6$, $z^7$, one after the other and by turning wheel M through the required angles, sets the bay and platform registers on the controllers D and E respectively. The zero position of these controllers D, E that is to say the initial position of the adder wheels and register wheel M before being set with a definite register, is in each case the scheduled number of the despatching station, thus the actual displacement of the selector disks $w^2$ $w^3$ $w^6$ $w^7$ is the difference between the scheduled numbers of the receiving and despatching stations and platforms respectively which equals the number of receiving points and platforms to be passed before the destination is reached. As long as the wheel M is depressed the contact breaker 14 is open and breaks the circuit through the selector disks $w^3$ $w^7$ preventing any action at the despatch bay until the registers are set. The registers having been set and wheel M liberated, the contact breaker 14 is still prevented from returning to its closed position by the catch 15. A projection 200 on the front of the trucker which next passes actuates a suitable contact which momentarily makes the contact N N, putting the electromagnet $o^2$ across the poles 16, 18 of the battery through the leads 16, 18, releasing catch 15 and allowing the circuit breaker 14 to close and make the circuit through the selector disks $w^3$ $w^7$. This contact is shown in Fig. 5a and consists of a rod 201 slidably mounted on the side wall 108 in a bracket 202 and provided on its outer end with a roller 203. Its inner end is provided with a contact block 204 adapted to be forced between the contact springs N N whenever the projection 200 meets the roller 203. A spring 205 acting against a stop 206 forces said rod away from the springs N N as soon as the projection 200 has passed. This operation prevents any action of the mechanism until the setting of the register or the controllers is complete, and also prevents any correspondence with a trucker which has already passed the trigger point. The throwover switch F is at this period in the engaged position $F^1$ and thus the wiper 5 is connected through leads 19, 20, 21, selector disks $w^3$, $w^7$, contact 14, lead 16 to the positive pole of the battery. The selector disks $w^3$ $w^7$ are so constructed that in the zero position of their differential shafts, the circuit 21 is broken; but is made immediately both disks are displaced, so that current cannot pass through both selector disks unless both have a register. The despatching station is now waiting the arrival of a disengaged trucker. It must be understood that the bay wipers and trucker strips are so arranged that all the contacts are practically simultaneous. Now, a disengaged trucker will have its switch K in the unloaded position $K^1$, and the strip 5 will therefore be connected by circuit 22, 23, 24, to the strip 6, which circuit includes the electromagnet $z^1$. At the instant strips 5 and 6 make contact with the respective bay wipers a current will pass from the positive pole 16, contact 14, 21, through disks $w^3$, $w^7$, 20, magnet G, 19, wiper 5, 22, 23 magnet $z^1$, strip 6, to negative pole 18 of the battery and a current will flow. This current energizes the bay magnet G and the trucker magnet $Z^1$ causing the bay switch F to throw over to position $F^2$ and the trucker switch K to the position $K^2$. Simultaneously with the closing of these switches the circuit including bay switch magnet $H^2$ is closed on the battery through 16, 25, 26, 18, the magnet being energized closing the switch $H^1$ which energizes the transfer gear of both bay and trucker through the circuits consisting of the positive pole of battery 16, 27, H, 28, wiper and strip 1, 29, rollers $L^3$, clutch $L^2$, strip and wiper 4, to negative pole 18 of the battery. This circuit including bay clutch and rollers H and trucker clutch $L^2$ and rollers $L^3$, the tray is transferred to the trucker in the manner already described. For a bay situated on the opposite side of the platform a similar circuit would have been energized, but through clutch and rollers $H^2$, wiper and strip 2, trucker rollers L, clutch $L^1$ wiper-strip 3, through a lead corresponding to battery lead 18, (the connections shown by dotted lines are in reality on the opposite bay). Simultaneously with the above action the bay subber magnet $w^1$ is connected to the trucker adder magnet $x^1$ through the alternating current circuit 30, selector disk $w^2$, 19, strip and wiper 5, 22, 31, 32, strip and wiper 9 to alternator pole 33; and the platform subber magnet $w^5$ is connected to the trucker adder magnet $y^1$ through circuit 34, selector disk $w^6$, 19, strip and wiper 5, 22, 35, wiper and strip 8, 36 to alternator. The selector disks $w^2$, $w^6$, included in these circuits are termed zero disks, that is to say they break contact when the controllers are in the zero position, that is when there is no register thereon. Immediately the above mentioned circuits are closed, the alternating current passes through the subber and adder magnets $w^1$ $x^1$, $w^5$ $y^1$, of the bay and trucker controllers and the bay subber wheels $w$ $w^4$ are moved tooth by tooth synochronously with but in opposite directions to the adder wheels $x$ $y$ of the trucker controllers, thus reducing the bay and platform registers of the bay controllers D, E, to zero, and transferring the said registers to the trucker controllers I, J. It follows that as soon as the whole of the bay and platform register has been transferred to the trucker controllers the zero selector disks $w^2$, $w^6$ will both break circuit, the controllers D and E being at zero. The contact strips 5 and 8 are of such a length that with the frequency of the alternating current used, the number of pulsations required to transmit the greatest possible register from that particular despatch bay can pass during the duration of the contact. We have obtained good results, when employing an alternating current of 10 waves per second, that is to say giving 20 alternations or impulses per second, the adder and subber magnets being provided with cores formed of bunches of soft iron wire, the apparatus being as shown in Fig. 9. The tray has now been transferred to the trucker, and the trucker controllers I, J, set to the original register with which the operator set the bay controllers D and E. The controllers D, E are now at zero and the switch F is in the position $F^2$. The tail end of the trucker in passing away, momentarily closes the contacts P, P, (such as shown in Fig. 5a) and places the electromagnet $G^1$ across the battery through circuit 37, 26, negative pole 18, 16 to positive pole 16, and throws the switch F into the engaged position $F^1$. Though the controllers D, E are used again in the engaged position $F^1$ no action can take place with a passing disengaged trucker, because the controllers D, E being at zero, the selector disks $w^3$, $w^7$ have broken circuit, and can not make circuit again until the operator sets the next register by means of the wheel M as before described. The trucker is now clear of the despatching point, and goes on its way carrying the tray with its correct address, that is its bay and platform registers on the controllers I J.

Before the next bay is reached, the trucker passes a bay register point (Fig. 10$^a$), consisting of two wipers connected to a direct current supply 140 and which make contact with the corresponding trucker strips 7, 9, thus sending a direct current, single impulse, through circuit strip and wiper 7, 38, magnet $x^3$, zero disk $x^4$, 39, 32, strip and wiper 9, which causes the subber magnet $x^3$ to give one stroke and remove 1 from the bay register of the wheel $x^2$ of controller I. The trucker passes on until a receiving bay is reached and the despatch bays passed *en route* cannot affect it, owing to the switch K being in the engaged position K$^2$. If in the case we are considering the next receiving point is the destination of the trucker, it follows, that the despatcher did not set a platform register at all, but only a bay register of 1, which has just been removed by the bay register point as described. So, it follows that both the bay and platform controllers I, J, of the trucker are at zero. Now, referring to Fig. 11 which shows the trucker making contact with the receiving bay R, this bay R is provided with the contact wipers 1, 3, 5, 11, which are adapted to make contact with corresponding trucker strips, and also with switches F, H$^1$ and transfer mechanism H of the construction already described with reference to the despatching bay, switch F being in position F$^2$ and K at K$^2$, Fig. 10. Immediately on reaching the bay, wipers and strips 11 and 5 make contact and the following circuits are closed:—positive pole 40 of the battery, wiper 11, 41, zero selector disk $x^5$, 42, $y^6$, 43, magnet Z, 22, wiper 5, 44, 45, magnet G$^1$ to the negative pole 46 of the battery thus energizing the magnets G$^1$ on the bay and Z on the trucker and throwing over the switches F and K into the positions F$^1$ and K$^1$ respectively. At the same time the magnet H$^2$ is put across the poles of the battery through the circuit, 40, 47, 48, 46, operating the switch H$^1$ and closing the circuit-positive pole 40, 49, clutch and rollers H, 50, wiper and strip 1, 29, rollers L$^3$ clutch L$^1$, 51, strip and wiper 3, 46 to negative pole of battery. Thus the trucker and bay rollers are energized and the tray is transferred to the bay. For a receiving point on the opposite side of the platform the circuit would be H$^3$, 52, strip and wiper 2, rollers L clutch L$^2$, strip and wiper 4; 53, to battery pole 46. The tray having been discharged the trucker in passing forward closes momentarily (by means of a suitable contact or trigger not shown) the contact Q Q, energizing the circuit 54, to positive pole 40, 55, magnet G, 48, to negative pole 46 of battery. The magnet G being thus energized throws the switch F into the position F$^2$. If, however, the tray was destined for a more distant receiving bay, on the same half platform, the trucker bay register on controller I would not have been reduced to zero, so the trucker would pass on till a sufficient number of bay register points had been passed and the controller placed in the zero position, when the circuits as above described would be completed with the receiving bay and the tray discharged.

The operation of the system in transferring a tray between bays on the same division platform has now been described, it now remains to describe the action when a trucker is addressed to deliver a tray to a receiving bay on another divisional platform. In this case, as already indicated, the trucker controller J is set with the required platform register and the controller I with the required bay register.

Referring now to Fig. 12:—The main platform truckers receive the current necessary to energize the trucker mechanism and controllers from contact strips 56, 57, 58, 59, 60, 61, 62 placed at suitable heights on the clearing house wall and making contact with wipers carried on the trucker side. These contact strips run the length of the transfer position, so that current is supplied to the trucker during the whole time it is passing the ends of the divisional platforms. U$^2$ U$^2$ represent the outside edges of the main platform trucker, and S is the bay controller, comprising adder wheel $o^4$, operating magnet $o^3$, subber wheel $o^5$, subber magnet $o^6$ and selector disk $o^7$. T is the platform controller, comprising adder wheel $o^8$ actuating magnet $o^9$ subber wheel $o^{11}$ actuating magnet $o^{10}$ and selector disk $o^{12}$. U U$^1$ are two magnets operating switches, and V is a double throw switch of the kind previously described with reference to the despatch and receiving stations. X is a double throw switch adapted to throw over on a certain decrease or stoppage of the current as hereinafter described. Y Y$^1$ represent the transfer rollers and clutches. On the main trucker overtaking the divisional trucker the operations are as follows:—The main trucker has its switches V and X in the position V$^2$, X$^1$ respectively, the divisional trucker switch K being at K$^2$, a circuit is thus completed from positive pole 58, 63, through strip and wiper 12, 64, selector disk $y^7$, magnet Z, 22, strip and wiper 5, 65, 66 magnet V$^3$ to negative pole 59, thus energizing magnets Z and V$^3$ and throwing switches K and V to positions K$^1$ and V$^1$ respectively. The switch X is still in position X$^1$. In this circuit is included selector disk $y^7$ which is so arranged that it completes circuit at all positions of the differential shaft except predetermined positions which vary in accordance with the position of the divisional platform in the clearing house, on which the particular trucker is fitted. It always, however, breaks circuit at the zero position and at all other positions where it may be desirable to prevent the tray from being transferred to the main platform. In the event therefore of the tray's destination lying on the other half of the divisional platform on which it started, this disk $y^7$ will break the circuit and no transfer will take place. If however contact is made by the disk $y^7$, the above described circuit will be closed, the first results of this being the closing of the circuit through positive pole 58, 63, 67, magnet U, 68, 69 magnet coil $X^3$, 70, to negative pole 59, energizing the magnet U which then closes by means of its switch the circuit, positive pole 58, 67 70, clutch and rollers Y, strip and wiper 1, 29, rollers $L^3$ clutch $L^1$, strip and wiper 3, 71, coil $X^3$ 70, to negative pole 59, operating the trucker mechanism and transferring the tray. As the main trucker continues to overtake the divisional trucker a projection on the latter (such as 200 Fig. 5$^a$) makes the contact 70, 71$^a$ and thereby short-circuits the coil $X^3$. The switch X is of a suitable solenoid type, the construction being such that the blade of the switch is held in the position $X^1$ against the pull of a spring as long as a current of sufficient magnitude passes through the coil $X^3$, but as soon as the current in the said coil decreases or is cut off, then the switch blade is pulled over by the spring into the position $X^2$. Thus when the coil $X^3$ is short circuited as above described, the switch X is pulled over to the position $X^2$ breaking the circuit 69, 68, which opens switch U and deënergizes the clutches and rollers of the transfer gears. A suitable construction of switch is shown in Fig. 12$^a$ in which the switch arm X is operated by a roller 152 mounted on an arm 153 pivoted to a core 154 within the coil $X^3$, said roller working in a cam slot 155 as shown. Normally the arm X is in the position $X^1$ in which position it is held by the current in coil $X^3$, the roller 152 being in the position shown in the dotted lines. As soon however as the current falls below a certain predetermined amount or is interrupted, the springs 156, secured to a bar 157 to which the end of the core 154 is attached, force the core 154 outward and pull the arm 153 into the position shown. A spring 158 is employed to assist the arm 153 over the point in the cam slot. Now returning to the instant at which switch V was thrown over to the engaged position $V^1$ switch K then being in position $K^1$, the following circuit was closed, alternately 56, strip 9, 32, 39, disk $x^4$, subber magnet $x^3$, 38, 22, strip and wiper 5, 65, 72, bay adder magnet $o^3$, alternator 57. The result of this action is to transfer the bay register from the divisional trucker to the main platform. Simultaneously with the last mentioned circuit, a circuit is completed from alternator 62, strip and wiper 8, 35, platform subber $y^3$, disk $y^4$, 73, 22, strip and wiper 5, 65, 74, adder $o^9$, to alternator 61, thereby transferring the platform register to the main platform trucker. The tray is now upon the main platform trucker and the correct register has been transferred. The trucker proceeding to the next divisional platform meets a platform register point, similar to a bay register point, which supplies current momentarily to the circuit wiper 5, 65, 81, subber magnet $o^{10}$, negative pole 60, and one unit is removed from the platform register. The negative register contact strip is shown in dotted lines at 60, the positive contact not being shown. If the platform register is thereby reduced to zero, on arrival at the next transfer position, the following circuit is completed, through the receiving trucker, positive pole 58, 63, 75, selector disk $o^{12}$, 76, magnet $V^4$, 65 strip and wiper 5, 22, 23, magnet $Z^1$, 24, strip and wiper 6, to negative pole 59, the switches V and K being thrown to the positions $V^2$ and $K^2$ respectively. The switch X is in the position $X^2$. Simultaneously the following circuits are closed, positive pole 58, 67, magnet U', 77, 78, coil $X^3$, 70 to negative pole 59, energizing the switch $U^1$, which closes the circuits energizing the trucker rollers, and clutch L, $L^1$ as previously described at a receiving station, the circuit through alternator 57, subber magnet $o^6$, zero disk $o^7$, 79, 65, strip and wiper 5, 22, 80, adder $x^1$, 32, strip and wiper 9, to alternator 56, being also closed transferring the bay register to the receiving trucker. The receiving trucker now passes along its divisional platform, the bay register being removed by the bay register points, and delivers the tray at the correct receiving bay, exactly in the manner described with reference to Fig. 11. When the destination of a tray lies on another platform from that on which it started, it may easily happen that it arrives at a point in its journey where the platform register has a definite amount but where the bay register has been reduced to zero. As the next succeeding bay is not the destination of the tray, the bay register has to be still further reduced (as hereinafter described with reference to Fig. 13), and this is permitted by the following arrangement, (referring to Fig. 10):—When the platform register has a definite amount, the disk $y^5$ on the platform controller J, which is not at zero, provides an alternative path and allows the bay register point (such as shown in Fig. 10$^a$) to operate the subber magnet $x^2$ through the following circuit strip and wiper 7, 38, $x^3$ 38$^a$ $y^5$ 32, strip and wiper 9. In like manner when a main platform trucker is unable to discharge on to the divisional platform, on which the destination of the tray lies, the trucker is carried past the next register point (such as shown in Fig. 10$^a$), when a further unit is removed from the platform register, and the trucker is consequently carried another round without discharging.

The general operation and control of the system has now been described and referring to Fig. 13 we will now describe the operation and control of a particular system, the bays and platforms of which are numbered according to one suitable method. Fig. 13 is a diagrammatic view of a clearing house arranged on the plan described with reference to Fig. 1. $d$ is the main platform, the divisional platform being numbered in Roman numerals I to VI consecutively. The bays on each divisional platform are numbered 1 to 20 and the bay register points +, one for each receiving point, are arranged as shown on platforms I and VI. Each bay has both a receiving and despatch point, and the bays may be arranged on both sides of the divisional platform if desired. Each divisional platform trucker controller has its bay selector contact disk, which as before described can be advanced one point by the adder magnet and set back one point by the subber magnet on passing a suitable register point, so arranged, that the zero or contact point at which the transfer mechanisms are energized, is always brought into the position for discharging a tray after the desired number of bay register points has been passed. The bay register described on each despatch controller has the receiving point numbers so arranged thereon, that the zero position is represented by its own particular bay number. For example the operator at bay 1 in despatching to bay 10 on the same platform, displaces the register disk zero by 9 points, which 9 points are communicated to the receiving trucker. The trucker in passing down the platform passes 9 register points +, and the subber magnet therefore replaces the zero into the discharge position when bay 10 is reached and the tray is discharged. In despatching a tray with both platform and bay registers say from bay 5 platform I to bay 10 on platform VI, the bay register would be 5 and the platform register also 5. In this case, the trucker moves toward the transfer position K$^7$ passing 5 register points +, its selector contact disk being therefore in the discharge position at bay 10, but as we have already shown, the platform controller prevents discharge as long as a platform register remains, so the tray is transferred to the receiving main trucker together with the platform register of 5 and as the bay register is zero the main trucker bay register also remains at zero. As the main trucker passes toward platform VI the platform register points P$^3$ P$^4$ P$^5$ P$^6$ P$^7$, acting on the subber circuit of the controller, each remove one point from the platform register so that on arriving at K$^9$, the trucker discharges to the receiving divisional trucker on platform VI, and having a zero bay register the receiving trucker bay register is unaltered and it is therefore in position to discharge at bay 11, but is prevented from so doing by the + point K$^6$ which acting on the adder circuit of the trucker controller displaces the zero one point, that is to say adds one point to the register. The trucker passes on and it follows that the selector disk will be in the zero or discharge position again after 19 + points have been passed, thus discharging the tray at bay 10 as required. If it should happen that the trucker on platform I addressed with bay and platform registers of 5 respectively, is unable to transfer to the main platform at K$^7$ for any reason, then it follows that the trucker will have a zero bay register at bay 10 but will be prevented from discharging by the platform register and so the tray will be carried around to K$^{12}$. When K$^{12}$ is reached the trucker bay register under the action of the subber magnets will be 10 points, so the main trucker at K$^{12}$ will receive the tray and a platform register of 5 and a bay register of 10, and passing along, a suitable register point K$^{10}$ makes contact with the trucker bay subber circuit and displaces the trucker selector contact disk a further 10 points and so brings the said zero into the contact position, the tray then being correctly addressed for a discharge at bay 10 platform VI as before described. If for any reason the tray failed to transfer at K$^{12}$, it is obvious that the trucker in traveling on to K$^7$ will have its bay register reduced to zero and be thus correctly addressed to transfer at K$^7$. Again, a tray starting from bay 1 platform I and addressed to platform IV bay 10 will have a bay register of 9 points and a platform register of 3, which platform register will have been removed when K$^{13}$ is reached by the points P$^3$ P$^4$ P$^5$. If transfer at K$^{13}$ is impossible the trucker passes on and the platform register zero is displaced two points by the register points P$^6$ P$^7$ acting on the subber wheel, a suitable register point K$^{11}$ is then passed which adds 10 points to the trucker bay adder wheel and the bay register is corrected to discharge at bay 10 platform IV and in order to correct the platform register, to enable a transfer to be effected at K$^{14}$, the platform register points P$^8$ P$^9$ P$^{10}$ P$^{11}$ P$^{12}$ are provided which act upon the trucker adder wheel; in this case P$^8$ and P$^9$ only operate, and restore the platform selector disk zero into the transfer position at K$^{14}$. If transfer had been impossible at K$^{14}$, it follows that the trucker would pass on and the adder register points P$^{10}$ P$^{11}$ P$^{12}$, acting on the platform adder circuit would add 3 points to the platform register which would be subtracted by the three points $P^3$ $P^4$ $P^5$ on the opposite side acting on the platform subber circuit, the bay register being connected at $K^{10}$ and thus the trucker would be automatically in readiness to discharge when $K^{13}$ is again reached. The bay register corrector points $K^{10}$, $K^{11}$, may be on an alternating current circuit if desired, or on a direct current circuit, in which latter case, the trucker contact strips of the bay adder and subber circuits must be corrugated or otherwise arranged so as to break contact the required number of times in passing the said corrector points.

The various alternating and direct current circuits of the system may be supplied from a suitable central source.

It will be obvious that the control system herein described may be modified in many ways and readily adapted to various requirements. By varying the positions and combinations of the selector disks on the controller shafts by interposing zero, make or break selector disks in the various controller circuits, many combinations are possible, and by adding or subtracting amounts to or from the trucker registers by means of suitable register points, the routes of the trays may be automatically varied as desired.

What is claimed is:—

1. A system for handling sorting and delivering parcels and the like comprising an endless moving conveyer, electrically operated rotating rollers for automatically delivering the parcels or the like on to said conveyer and means for automatically discharging said parcels or the like at the required destination.

2. A system for handling, sorting and delivering parcels and the like comprising an endless moving conveyer, electrically operated rotating rollers for automatically delivering the parcels or the like on to said conveyer, and for discharging said parcels or the like at the required destination.

3. A system for handling, sorting and delivering parcels and the like comprising an endless moving conveyer trays having bottoms of magnetic material for containing parcels and the like electrically operated magnetic rotating rollers for automatically delivering said trays on to said conveyer and for discharging said trays at the required destination.

4. A system for handling sorting and delivering parcels and the like comprising an endless moving conveyer trays having bottoms of magnetic material for containing the parcels, electrically operated magnetic rollers for automatically delivering said trays on to the said conveyer and for discharging said trays at the required destination said rollers being automatically magnetized and rotated by the passage of the conveyer past certain contacts.

5. A system for handling sorting and delivering parcels and the like comprising a series of despatching and receiving stations, electrically operated magnetic rotating transfer rollers provided at each station and upon the conveyer, and trays having bottoms of magnetic material for containing the parcels.

6. A system for handling sorting and delivering parcels and the like comprising a series of despatching and receiving stations, electrically operated magnetic rotating transfer rollers at each station, an endless moving conveyer formed of a series of sections running on a track rail, certain sections being provided with electrically operated rotating magnetic transfer rollers, said transfer rollers being automatically and synchronously magnetized and rotated by the passage of the conveyer past certain contacts.

7. A system for handling sorting and delivering parcels and the like comprising a series of despatch and receiving stations provided with electrically operated magnetic rotating transfer rollers for the purpose described an endless moving conveyer formed of a series of sections suitably linked together supported on track wheels and running on a track rail certain sections of said conveyer being provided with electrically operated magnetic rotating transfer rollers receiving their motion from the track wheel of the section, said transfer rollers being automatically and synchronously magnetized and set in motion by the passage of the conveyer past certain contacts.

8. A system for handling sorting and delivering parcels and the like comprising a series of despatch and receiving stations provided with electrically operated magnetic rotating transfer rollers for the purpose described, an endless moving conveyer formed of sections suitably linked together supported on a track wheel running on a track rail, certain sections being provided with electrically operated magnetic transfer rollers receiving their motion from the track wheel of the section, said rollers both at the stations and on the conveyer being automatically and synchronously energized and set in motion at the correct instant by the passage of the conveyer past certain contacts and means for causing said rollers to rotate at a speed increasing to a maximum and then decreasing until said rollers are stationary.

9. A system for handling sorting and delivering parcels and the like comprising a series of despatch and receiving stations provided with electrically operated magnetic rotating transfer rollers for the purpose described, an endless moving conveyer formed of sections suitably linked together supported on a track wheel running on a track rail, certain sections being provided with electrically operated magnetic transfer rollers receiving their motion from the track wheel of the section, said rollers both at the stations and on the conveyer being automatically and synchronously energized and set in motion at the correct instant by the passage of the conveyer past certain contacts, and gearing including a cam wheel for rotating the said transfer rollers at a speed increasing to a maximum and then decreasing till the rollers are stationary.

10. A system of handling sorting and delivering parcels and the like comprising a series of despatch and receiving stations provided with electrically operated magnetic rotating transfer rollers, trays having bottoms of magnetic material for containing parcels and the like, an endless moving conveyer formed of sections suitably linked together, certain sections being provided with electrically operated magnetic rotating rollers, controllers provided at each despatch station and carried upon each working section of the conveyer for causing the automatic delivery of a parcel tray on to the conveyer and the automatic discharge of said tray at the correct station.

11. A system of handling sorting and delivering parcels and the like comprising a series of despatch and receiving stations provided with electrically operated magnetic rotating transfer rollers, trays having bottoms of magnetic material for containing parcels and the like, an endless moving conveyer formed of sections suitably linked together, certain sections being provided with electrically operated magnetic rotating rollers, controllers provided at each despatch station and carried upon each working section of the conveyer said controllers each comprising a differential shaft provided with a series of switches and means actuated by an electric current, for automatically turning said differential shaft.

12. A system of handling sorting and delivering parcels and the like comprising a series of despatch and receiving stations provided with electrically operated magnetic rotating transfer rollers, trays having bottoms of magnetic material for containing parcels and the like, an endless moving conveyer formed of sections suitably linked together, certain sections being provided with electrically operated magnetic rotating rollers, controllers provided at each despatch station and carried upon each working section of the conveyer said controllers each comprising a differential shaft provided with a series of switches, electromagnets energized by alternating currents and acting upon pawls engaging gear wheels on the differential shafts of said controllers for the purpose specified.

13. A system of handling sorting and delivering parcels and the like comprising a series of despatch and receiving stations provided with electrically operated magnetic rotating transfer rollers, trays having bottoms of magnetic material for containing parcels and the like, an endless moving conveyer formed of sections suitably linked together, certain sections being provided with electrically operated magnetic rotating rollers, controllers provided at each despatch station and carried upon each working section of the conveyer said controllers each comprising a differential shaft provided with a series of switches, electromagnets energized by alternating currents and acting upon pawls engaging gear wheels on the differential shafts of said controllers for the purpose specified, and contact brushes supplied with electric current and placed at each station and at various intermediate points for operating said controllers.

14. A system for handling sorting and delivering parcels and the like comprising a series of despatch and receiving stations each provided with a pair of electrically operated magnetic rotating transfer rollers trays having bottoms of magnetic material for containing parcels and the like, an endless moving conveyer formed of sections suitably linked together alternate sections being provided with two pairs of electrically operated magnetic rotating rollers, controllers provided at each despatch station and carried upon each working section of the conveyer said controllers each comprising a differential shaft provided with a series of switches, electromagnets energized by alternating currents and acting upon pawls engaging gear wheels on the differential shafts of said controllers for the purpose specified.

15. A system for handling sorting and delivering parcels and the like comprising a series of endless moving conveyers, magnetic rotating transfer rollers for automatically delivering the parcels and the like on to the conveyers transferring the parcels from conveyer to conveyer and for discharging said parcels and the like at the required destination.

16. A system for handling sorting and delivering parcels and the like comprising a series of endless moving conveyers, electrically controlled magnetic rotating transfer rollers for automatically delivering the parcels and the like on to the conveyers, transferring the parcels and the like from conveyer to conveyer and for discharging said parcels and the like at the required destination.

17. A system for handling sorting and delivering parcels and the like comprising a series of endless moving conveyers, trays having bottoms of magnetic material for containing the parcels, and electrically controlled magnetic rotating transfer rollers for automatically delivering, transferring and discharging the said trays.

18. A system for handling sorting and delivering parcels and the like comprising a series of endless moving conveyers a series of despatch and receiving stations, trays having bottoms of magnetic material, electrically controlled rotating magnetic rollers arranged at each despatch and receiving station and carried upon each working section of the conveyers.

19. A system for handling sorting and delivering parcels and the like comprising a series of endless moving conveyers, a series of despatch and receiving stations, trays having bottoms of magnetic material, electrically controlled rotating magnetic rollers arranged at each despatch and receiving station and carried upon each working section of the conveyers, said rollers being adapted to be automatically and synchronously magnetized and rotated at the correct instant, by the passage of the conveyer sections past certain electrical contacts.

20. A system for handling sorting and delivering parcels and the like comprising a series of endless moving conveyers, a series of despatch and receiving stations, trays having bottoms of magnetic material, electrically controlled rotating magnetic rollers arranged at each despatch and receiving station and carried upon each working section of the conveyers said rollers being adapted to be magnetized and synchronously rotated at a speed which is uniformly increased to a maximum and then gradually decreased until the said rollers are stationary by the passage of a conveyer past certain electrical contacts.

21. A system for handling sorting and delivering parcels and the like comprising a series of endless moving conveyers, consisting of a series of sections suitably linked together, each supported upon a track wheel running upon a track rail, certain sections being provided with electrically controlled magnetic rotating rollers, which derive their motion from the track wheel of the section.

22. A system for handling sorting and delivering parcels or the like comprising a series of endless moving conveyers consisting of a series of sections suitably linked together each supported upon a track wheel running upon a track rail, certain of the sections being provided with electrically controlled magnetic rotating rollers which derive their motion from the track wheel of the section, said motion being transmitted through cam gearing so that said rollers are rotated at a speed which is uniformly increased to a maximum, and then gradually decreased until said rollers are stationary.

23. A system for handling sorting and delivering parcels and the like comprising a series of endless moving conveyers consisting of a series of sections suitably linked together each supported upon a track wheel running upon a track rail, certain of the sections being provided with electrically controlled magnetic rotating rollers, cam gearing for rotating the rollers at the required speed and magnetic clutches operated by the passage of the conveyers past certain contacts when the said rollers are required to be rotated.

24. A system for handling sorting and delivering parcels and the like, comprising a series of endless moving conveyers consisting of a series of sections suitably linked together each supported upon a track wheel running upon a track rail, certain of the sections being provided with electrically controlled magnetic rotating rollers cam gearing and magnetic clutches for rotating said rollers when required, and a series of stations each provided with magnetic rotating rollers receiving their motion from a shaft and magnetic clutches, the said rollers on both the conveyers and the stations being synchronously magnetized and rotated by the passage of the conveyer past certain contacts for the purpose described.

25. A system for handling sorting and delivering parcels and the like comprising endless moving conveyers, electrically operated rotating rollers for automatically delivering the parcels or the like on to said conveyers, means for automatically discharging said parcels or the like at the required destination, and electrical controlling means for the transfer rollers of the system comprising controllers placed on each working section of the conveyers and at each despatch station.

26. A system of handling sorting and delivering parcels and the like comprising a series of despatch and receiving stations provided with electrically operated magnetic rotating rollers for the purpose described, trays having bottoms of magnetic material for containing the parcels, a series of endless moving conveyers formed of sections suitably linked together certain sections being provided with electrically operated magnetic rotating rollers controllers provided at each despatch station and carried upon each working section of the conveyers for causing the automatic delivery of a parcel tray on to a conveyer automatic discharge of said tray from conveyer to conveyer if necessary, and automatic delivery at the correct station.

27. A system of handling sorting and delivering parcels and the like comprising a series of despatch and receiving stations provided with electrically operated magnetic rotating rollers for the purpose described, trays having bottoms of magnetic material for containing the parcels, a series of endless moving conveyers formed of sections suitably linked together certain sections being provided with electrically operated magnetic rotating rollers controllers provided at each despatch station and carried upon each working section of the conveyers said controllers each comprising a differential shaft provided with a series of switches and means for automatically turning said differential shaft.

28. A system of handling sorting and delivering parcels and the like comprising a series of despatch and receiving stations provided with electrically operated magnetic rotating rollers for the purpose described, trays having bottoms of magnetic material for containing the parcels, a series of endless moving conveyers formed of sections suitably linked together certain sections being provided with electrically operated magnetic rotating rollers controllers provided at each despatch station and carried upon each working section of the conveyer said controllers each comprising a differential shaft provided with a series of switches, electromagnets, energized by suitable currents and acting upon pawls engaging gear wheels on the differential shafts of said controllers for the purpose specified.

29. A system of handling sorting and delivering parcels and the like comprising a series of despatch and receiving stations provided with electrically operated magnetic rotating rollers for the purpose described, trays having bottoms of magnetic material for containing the parcels, a series of endless moving conveyers formed of sections suitably linked together certain sections being provided with electrically operated magnetic rotating rollers, controllers provided at each despatch station and carried upon each working section of the conveyers, said controllers each comprising a differential shaft provided with a series of switches electromagnets energized by suitable currents and acting upon pawls engaging gear wheels on the differential shafts of said controllers for the purpose specified and contact brushes supplied with electric current and placed at each station and at various intermediate points for operating the said controllers in the manner described.

30. A system of handling sorting and delivering parcels and the like comprising a series of despatch and receiving stations provided with electrically operated magnetic rotating rollers for the purpose described, trays having bottoms of magnetic material for containing the parcels, a series of endless moving conveyers formed of sections suitably linked together certain sections being provided with electrically operated magnetic rotating rollers each despatch station and each working conveyer section being provided with two controllers one for station numbers and one for conveyer or platform numbers, each controller comprising a differential shaft provided with a series of switches and electromagnets energized by suitable currents acting upon pawls engaging gear wheels on said differential shaft, and contact brushes supplied with electric current and placed at each station and at various intermediate points for operating said controllers in the manner described.

31. A system of handling sorting and delivering parcels and the like comprising a series of despatch and receiving stations each provided with a pair of electrically operated magnetic rotating rollers for the purpose described, trays having bottoms of magnetic material for containing the parcels, a series of endless moving conveyers formed of sections suitably linked together, alternate sections being provided with two pairs of electrically operated magnetic rotating rollers each dispatch station and each working conveyer section being provided with two controllers one for station numbers and one for conveyer or platform numbers, each controller comprising a differential shaft provided with a series of switches and electromagnets energized by suitable currents acting upon pawls engaging gear wheels on said differential shaft, and contact brushes supplied with electric current and placed at each station and at various intermediate points for operating said controllers in the manner described.

32. A system for handling sorting and delivering parcels and the like comprising a series of despatch and receiving stations $a$ $a^1$ $a^2$ arranged in groups A $A^1$ $A^2$ trays having bottoms of magnetic material for containing parcels endless moving divisional conveyers $b$ serving said groups, a main conveyer $d$ serving said divisional conveyers, magnetic rotating transfer rollers constructed as hereinbefore described and arranged at each station and upon alternate sections of the main and divisional conveyers, electrical circuits, contact strips and brushes arranged to automatically energize the said transfer gears on the passage of the conveyers past certain points, controllers D, E, on the despatch stations, controllers I, J, S, T, on the conveyer sections for controlling the various transfer gears.

33. In a system for handling sorting and delivering parcels and the like of the kind described, conveyer sections constructed of steel framing $g$ supported upon track wheels $g^2$, gear wheels $i$ $i^1$, $j$ $j^1$, $m$, $m^1$ $m^2$ $n$ $o$ $o^1$ two pairs of transfer rollers $p$ $p$ $q$ $q$ magnetic clutches for transmitting the motion of the track wheel $g^2$ to said transfer rollers, coupling plates $h^5$ $h^5$ for linking the conveyer sections together, guide wheels $h$ $h^1$ and guide rails $h^2$ all for the purpose specified.

34. In a system for handling sorting and delivering parcels and the like of the kind described a despatch station provided with controllers D E switches F G $G^1$ transfer rollers H, contact brushes and electric circuits all arranged as hereinbefore described for the purpose specified.

35. A system for handling sorting and delivering parcels and the like comprising a series of endless moving conveyers, means for automatically delivering parcels and the like on to said conveyers, means for automatically transferring the parcels and the like from conveyer to conveyer and means for automatically discharging said parcels and the like from the conveyer at the required destination and means for automatically causing a parcel to be again presented at the transfer or discharge point should it fail to be transferred or discharged at the first opportunity.

36. A system for handling sorting and delivering parcels and the like comprising a series of endless moving conveyers, means for automatically delivering parcels and the like on to said conveyers means for automatically transferring the parcels and the like from conveyer to conveyer and means for automatically discharging said parcels and the like from the conveyer at the required destination and electrical contacts placed at various points in the path of the conveyers for automatically operating the conveyer controllers so that the discharge or transfer will take place at the correct point in the event of a conveyer failing to transfer or discharge for any reason at the first opportunity.

In testimony whereof we have hereunto set our hands in the presence of the subscribing witnesses.

ALFRED WARWICK GATTIE.
ARTHUR GEORGE SEAMAN.

Witnesses as to Alfred Warwick Gattie:
H. D. JAMESON,
A. NUTTING.

Witnesses as to Arthur George Seaman:
EWALD SIMPSON MOSELEY,
GEORGE WEAVER.

---

Copies of this patent may be obtained for five cents each, by addressing the "Commissioner of Patents, Washington, D. C."